United States Patent
Sampath et al.

(10) Patent No.: US 9,265,048 B2
(45) Date of Patent: Feb. 16, 2016

(54) DOMINANT INTERFERER INDICATION IN ACCESS PROBE

(75) Inventors: Ashwin Sampath, Skillman, NJ (US);
Aamod D. Khandekar, San Diego, CA (US); Alexei Y. Gorokhov, San Deigo, CA (US); Mohammad J. Borran, San Diego, CA (US); Naga Bhushan, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 12/483,623

(22) Filed: Jun. 12, 2009

(65) Prior Publication Data

US 2010/0008244 A1    Jan. 14, 2010

Related U.S. Application Data

(60) Provisional application No. 61/080,032, filed on Jul. 11, 2008.

(51) Int. Cl.
*H04W 72/08* (2009.01)

(52) U.S. Cl.
CPC .................................. *H04W 72/082* (2013.01)

(58) Field of Classification Search
USPC .................................. 370/252, 431
See application file for complete search history.

(56) References Cited

U.S. PATENT DOCUMENTS

| | | | | |
|---|---|---|---|---|
| 2002/0045451 A1* | 4/2002 | Hwang et al. | ................. | 455/442 |
| 2005/0175027 A1* | 8/2005 | Miller et al. | ................. | 370/458 |
| 2005/0197132 A1* | 9/2005 | Lee et al. | ................. | 455/450 |
| 2006/0019665 A1* | 1/2006 | Aghvami et al. | ............. | 455/444 |
| 2006/0116145 A1* | 6/2006 | Hunzinger | ................. | 455/510 |

(Continued)

FOREIGN PATENT DOCUMENTS

| | | |
|---|---|---|
| DE | 19843982 A1 | 4/2000 |
| EP | 0913957 A1 | 5/1999 |

(Continued)

OTHER PUBLICATIONS

European Search Report—EP11163946—Search Authority—Munich—Jun. 20, 2011.

(Continued)

*Primary Examiner* — Huy Vu
*Assistant Examiner* — Adnan Baig
(74) *Attorney, Agent, or Firm* — Dalei Dong

(57) ABSTRACT

Systems and methodologies are described that facilitate indicating a dominant interferer to a target serving base station in a wireless communication environment. A mobile device can detect presence or absence of a dominant interferer. Further, an access probe that includes information related to the presence or absence of the dominant interferer can be generated. For example, the information can be included in a payload of the access probe as an explicit flag, an explicit indication of an interference level, a Channel Quality Indicator (CQI) value (e.g., reserved versus non-reserved, . . . ), etc. Moreover, the access probe can be transmitted to the target serving base station to initiate an access procedure. The target serving base station can select a time-frequency resource to be utilized for a responsive downlink transmission (e.g. access grant signal, subsequent access related message, . . . ) as a function of the information included in the access probe.

64 Claims, 13 Drawing Sheets

(56) References Cited

U.S. PATENT DOCUMENTS

| | | |
|---|---|---|
| 2006/0239238 A1* | 10/2006 | Fernandez-Corbaton et al. ............... 370/342 |
| 2006/0252377 A1 | 11/2006 | Jeong et al. |
| 2007/0010270 A1* | 1/2007 | Dillon ................ 455/513 |
| 2007/0105583 A1* | 5/2007 | Gerlach ............... 455/522 |
| 2008/0037450 A1* | 2/2008 | Itoh et al. ............ 370/278 |
| 2008/0045213 A1* | 2/2008 | Norris et al. .......... 455/435.1 |
| 2008/0057933 A1* | 3/2008 | Brunner ............... 455/422.1 |
| 2008/0102834 A1* | 5/2008 | Bernhard et al. ....... 455/436 |
| 2008/0171546 A1* | 7/2008 | Hyon et al. ........... 455/434 |
| 2008/0232326 A1* | 9/2008 | Lindoff et al. ........ 370/332 |
| 2009/0028120 A1* | 1/2009 | Lee .................... 370/338 |
| 2009/0059861 A1* | 3/2009 | Gunnarsson et al. ..... 370/331 |
| 2009/0233544 A1* | 9/2009 | Oyman et al. .......... 455/7 |
| 2010/0103852 A1* | 4/2010 | Jactat ................. 370/312 |
| 2010/0197308 A1* | 8/2010 | Racz et al. ........... 455/436 |

FOREIGN PATENT DOCUMENTS

| | | |
|---|---|---|
| EP | 1720373 A1 | 11/2006 |
| WO | WO0054536 A1 | 9/2000 |
| WO | WO2007092896 | 8/2007 |
| WO | WO2008055235 | 5/2008 |

OTHER PUBLICATIONS

International Search Report and Written Opinion—PCT/US2009/050298—ISA/EPO—Feb. 1, 2010.
Taiwan Search Report—TW098123464—TIPO—Jul. 30, 2013.

* cited by examiner

DOMINANT INTERFERER INDICATION IN ACCESS PROBE

CLAIM OF PRIORITY UNDER 35 U.S.C. §119

The present Application for Patent claims priority to Provisional Application No. 61/080,032 entitled "DOMINANT INTERFERER INDICATION IN ACCESS PROBE" filed Jul. 11, 2008, and assigned to the assignee hereof and hereby expressly incorporated by reference herein.

BACKGROUND

1. Field

The following description relates generally to wireless communications, and more particularly to indicating presence of a dominant interferer to a serving base station in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to mobile devices using a wireless technology (e.g., 3GPP Universal Mobile Telecommunications System (UMTS) or Long Term Evolution (LTE), 1x Evolution-Data Optimized (1xEV-DO), . . . ) to communicate with the mobile devices and an existing broadband Internet connection (e.g., digital subscriber line (DSL), cable, . . . ) for backhaul. A femto cell base station can also be referred to as a Home Node B (HNB), a femto cell, or the like. Examples of other types of base stations include pico cell base stations, micro cell base stations, and so forth.

Next generation wireless communication systems (e.g., LTE Advanced, . . . ) can support disparate types of base stations that send downlink transmissions at different power levels. Further, the disparate types of base stations can be deployed in an unplanned manner. Thus, coverage areas associated with the disparate types of base stations can overlap. By way of example, a mobile device, positioned at a given location, can attempt to connect to a base station (e.g., target base station, . . . ) associated with a strongest received downlink signal power. Pursuant to another illustration, the mobile device can attempt to connect to a disparate base station (e.g. target base station, target serving base station, . . . ) associated with a lower received downlink signal power when positioned at the given location. Following this illustration, the mobile device can experience significant interference from non-serving base station(s) (e.g., a non-serving base station associated with a strongest received downlink signal power, . . . ), particularly when attempting to connect to the target base station (e.g., via access procedures, . . . ); hence, access procedure performance can be detrimentally impacted by such interference.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with indicating a dominant interferer to a target serving base station in a wireless communication environment. A mobile device can detect presence or absence of a dominant interferer. Further, an access probe that includes information related to the presence or absence of the dominant interferer can be generated. For example, the information can be included in a payload of the access probe as an explicit flag, an explicit indication of an interference level, a Channel Quality Indicator (CQI) value (e.g., reserved versus non-reserved, . . . ), etc. Moreover, the access probe can be transmitted to the target serving base station to initiate an access procedure. The target serving base station can select a time-frequency resource to be utilized for a responsive downlink transmission (e.g. access grant signal, subsequent access related message, . . . ) as a function of the information included in the access probe.

According to related aspects, a method is described herein. The method can include identifying whether a dominant interferer is present within proximity of a mobile device. Further, the method can comprise generating an access probe that includes information relating to presence of the dominant interferer. Moreover, the method can include transmitting the access probe to a target serving base station to initiate an access procedure.

Another aspect relates to a wireless communications apparatus. The wireless communications apparatus can include at least one processor. The at least one processor can be configured to detect one of presence or absence of a dominant interferer based upon downlink interference measured by a mobile device. Moreover, the at least one processor can be configured to yield an access probe that includes an indicator corresponding to the detected one of presence or absence of the dominant interferer. Further, the at least one processor can be configured to send the access probe to a target serving base station.

Yet another aspect relates to a wireless communications apparatus. The wireless communications apparatus can include means for recognizing one of presence or absence of a dominant interferer. Further, the wireless communications apparatus can include means for yielding an access probe that carries an indicator that corresponds to the presence or absence of the dominant interferer. Moreover, the wireless communications apparatus can comprise means for sending the access probe to a target serving base station to initiate an access procedure.

Still another aspect relates to a computer program product that can comprise a computer-readable medium. The computer-readable medium can include code for causing at least one computer to identify whether a dominant interferer is present within proximity of a mobile device. Moreover, the computer-readable medium can include code for causing at least one computer to generate an access probe that includes information relating to presence of the dominant interferer. Further, the computer-readable medium can include code for causing at least one computer to transmit the access probe to a target serving base station to initiate an access procedure.

Yet another aspect relates to an apparatus that can include an interference evaluation component that measures strength of signals received from a target serving base station and at least one non-serving base station, and identifies whether one or more of the at least one non-serving base station is a dominant interferer. The apparatus can further include an access probe generation component that incorporates information that indicates presence or absence of the dominant interferer in a yielded access probe for transmission to the target serving base station.

In accordance with other aspects, a method is described herein. The method can include receiving an access probe from a mobile device that initiates an access procedure. Further, the method can include evaluating information included in the access probe to identify whether the mobile device has detected presence of a dominant interferer. Moreover, the method can comprise selecting a resource based at least in part upon whether the mobile device has detected presence of the dominant interferer. The method can also include transmitting at least one of an access grant signal or a subsequent access related message to the mobile device utilizing the selected resource.

Another aspect relates to a wireless communications apparatus. The wireless communications apparatus can include at least one processor. The at least one processor can be configured to analyze information included in a payload of an access probe received from a mobile device to identify whether the mobile device has detected presence of a dominant interferer. Moreover, the at least one processor can be configured to choose a resource based at least in part upon whether the mobile device has detected presence of the dominant interferer. Further, the at least one processor can be configured to send at least one of an access grant signal or a subsequent access related message to the mobile device utilizing the selected resource.

Yet another aspect relates to a wireless communications apparatus. The wireless communications apparatus can include means for analyzing information included in an access probe obtained from a mobile device to identify whether the mobile device has detected one of presence or absence of a dominant interferer. Moreover, the wireless communications apparatus can comprise means for choosing a time-frequency resource based at least in part upon whether the mobile device has detected presence or absence of the dominant interferer. Further, the wireless communications apparatus can include means for sending one or more of an access grant signal or a subsequent access related message to the mobile device utilizing the selected time-frequency resource.

Still another aspect relates to a computer program product that can comprise a computer-readable medium. The computer-readable medium can include code for causing at least one computer to analyze information included in an access probe obtained from a mobile device to identify whether the mobile device has detected one of presence or absence of a dominant interferer. Further, the computer-readable medium can include code for causing at least one computer to choose a time-frequency resource based at least in part upon whether the mobile device has detected presence or absence of the dominant interferer. Moreover, the computer-readable medium can include code for causing at least one computer to transmit one or more of an access grant signal or a subsequent access related message to the mobile device utilizing the selected time-frequency resource.

Yet another aspect relates to an apparatus that can include a signaled interference identification component that evaluates an access probe received from a mobile device to recognize that an indicator conveyed by the access probe specifies one of presence or absence of a dominant interferer. The apparatus can further include a resource allocation component that selects a time-frequency resource as a function of the specified one of presence or absence of the dominant interferer.

According to other aspects, a method is described herein. The method can include selecting at least one resource from a set of potential resources upon which a mobile device prefers to receive at least one of an access grant signal or a subsequent access related message in response to an access probe as a function of information related to downlink interference. Further, the method can include generating the access probe that includes an indicator that identifies the select at least one resource. Moreover, the method can include sending the access probe to a target serving base station.

Another aspect relates to a wireless communications apparatus. The wireless communications apparatus can include at least one processor. The at least one processor can be configured to select at least one resource from a set of potential resources upon which a mobile device prefers to receive at least one of an access grant signal or a subsequent access related message in response to an access probe as a function of information related to downlink interference. Moreover, the at least one processor can be configured to generate the access probe that includes an indicator that identifies the selected at least one resource. Further, the at least one processor can be configured to send the access probe to a target serving base station.

Yet another aspect relates to a wireless communications apparatus. The wireless communications apparatus can include means for selecting at least one resource from a set of potential resources upon which a mobile device prefers to receive at least one of an access grant signal or a subsequent access related message in response to an access probe as a function of information related to downlink interference. Further, the wireless communications apparatus can include means for generating the access probe that includes an indicator that identifies the selected at least one resource. Moreover, the wireless communications apparatus can include means for sending the access probe to a target serving base station.

Still another aspect relates to a computer program product that can comprise a computer-readable medium. The computer-readable medium can include code for causing at least one computer to select at least one resource from a set of potential resources upon which a mobile device prefers to receive at least one of an access grant signal or a subsequent access related message in response to an access probe as a function of information related to downlink interference. The computer-readable medium can further include code for causing at least one computer to generate the access probe that includes an indicator that identifies the selected at least one resource. Moreover, the computer-readable medium can include code for causing at least one computer to send the access probe to a target serving base station.

Yet another aspect relates to an apparatus that can include a downlink resource selection component that selects at least one resource from a set of potential resources upon which a mobile device prefers to receive at least one of an access grant signal or a subsequent access related message in response to an access probe as a function of information related to downlink interference. The apparatus can further include an access probe generation component that yields the access probe that includes an indicator that identifies the selected at least one resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
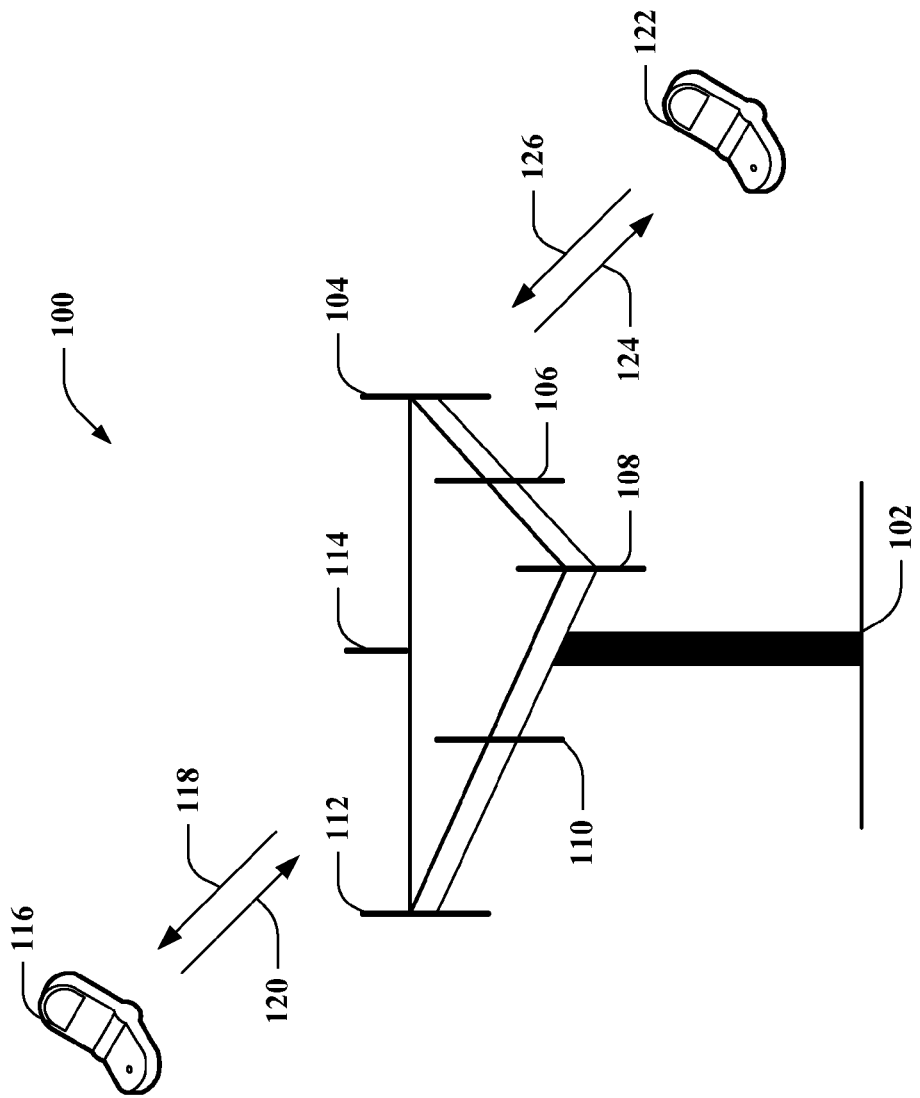
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

It is contemplated that base station 102 can be any type of base station (e.g., macro cell base station, micro cell base station, pico cell base station, femto cell base station, . . . ). A target base station (e.g., base station 102, disparate base station (not shown, . . . ) can be selected by each mobile device 116, 122 as its serving base station based on some optimality criterion such as, for instance, maximum received downlink signal power, minimum path loss, or the like. According to another illustration, selection of the target base station as a serving base station for each mobile device 116, 122 can be performed by an access network and respectively broadcast to each mobile device 116, 122. Moreover, mobile devices 116, 122 can access a cellular network via an access procedure by transmitting an access signal usually referred to as an access probe, access sequence, access preamble, etc. (referred to hereinafter as an access probe). The access probe can be intended for the target base station selected to be the serving base station for the respective mobile device 116, 122. Further, the target base station can respond to the access attempt of each mobile device 116, 122 (e.g., receipt of each access probe, . . . ) by transmitting an access grant signal, which can indicate resources for subsequent access exchange.

Mobile device 116, 122 can initiate an access procedure with the target base station associated with a received downlink signal power less than a received downlink signal power corresponding to a disparate base station (e.g., differing base station (not shown), base station 102, . . . ) for various reasons such as, for instance, to improve overall network capacity and/or performance, achieve enhanced uplink performance, and the like. Accordingly, the disparate base station can be a dominant interferer to mobile device 116, 122, thereby causing significant downlink interference. When employing conventional approaches, mobile device 116, 122 can be unable to obtain an access grant and/or subsequent access related messages sent by the target base station due to such interference. In contrast, system 100 can support indicating presence (or absence) of a dominant interferer to the target base station. More particularly, each mobile device 116, 122 can indicate presence of a dominant interferer to a respective, target base station as part of an access probe. Upon receiving an indication from mobile device 116, 122 concerning existence of a dominant interferer, base station 102 can leverage a mechanism to mitigate downlink interference (e.g., utilize disparate downlink resources such as reserved resources or resources specified by mobile device 116, 122, negotiate with the dominant interferer, disparate base station(s) and/or network node(s), . . . ) in connection with transmission of an access grant and/or subsequent access related messages.

System 100 can experience dominant interference scenarios in which mobile device 116, 122 attempts to connect to a base station (e.g. base station 102, . . . ) with lower received power (e.g., as compared to a dominant interferer, . . . ) if that base station has a lower path loss (e.g., as compared to the dominant interferer, . . . ). This can be the case if such base station has a significantly lower transmit power (e.g., pico cell base station, femto cell base station, . . . ) than the other base station (e.g., dominant interferer, . . . ) and will cause lower interference to the network in order to achieve a similar data rate. Similarly, on the reverse link, transmissions to the base station with lower path loss can cause lower interference to the network. According to another example, a dominant interference scenario can be due to a base station having restricted association. A mobile device (e.g., mobile device 116, 122, . . . ) can be prohibited from connecting to the restricted association base station (e.g. femto cell base station, . . . ) with a strongest channel, and thus, the restricted association base station can be a dominant interferer.

Figure 2:
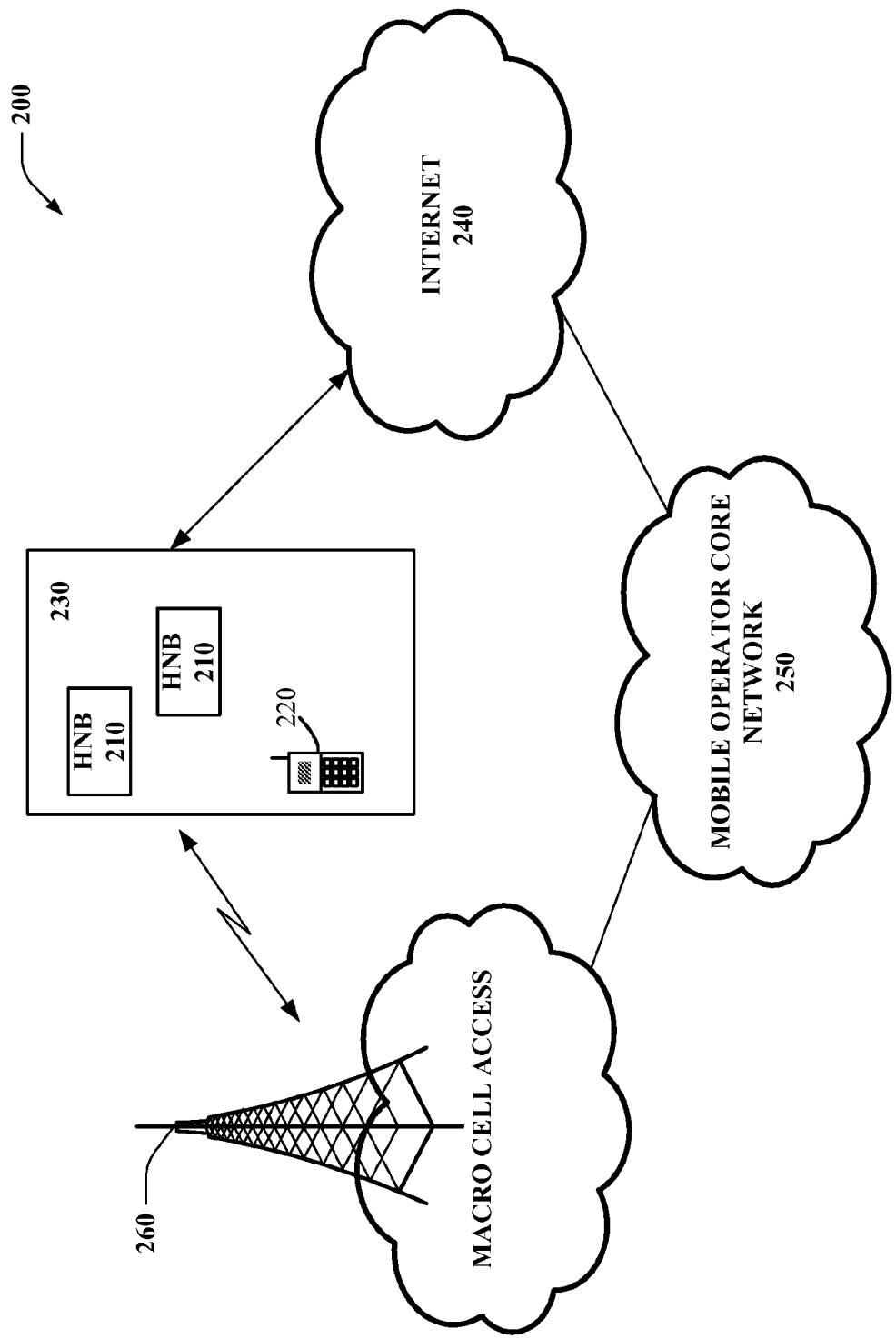
FIG. 2 is an illustration of an example system that enables deployment of access point base stations (e.g. femto cell base stations, . . . ) within a network environment.

FIG. 2 illustrates an exemplary communication system 200 that enables deployment of access point base stations (e.g. femto cell base stations, . . . ) within a network environment. As shown in FIG. 2, system 200 includes multiple femto cell base stations, which can also be referred to as access point base stations, Home Node B units (HNBs), femto cells, or the like. The femto cell base stations (HNBs 210), for example, can each be installed in a corresponding small scale network environment, such as, for example, in one or more user residences 230, and can each be configured to serve associated, as well as alien, mobile device(s) 220. Each HNB 210 is further coupled to the Internet 240 and a mobile operator core network 250 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of HNB 210 can subscribe to mobile service, such as, for example, 3G mobile service, offered through the mobile operator core network 250, and mobile device 220 can be capable to operate both in a macro cellular environment via a macro cell base station 260 and in a residential small scale network environment. Thus, HNB 210 can be backward compatible with any existing mobile device 220.

Sizes of downlink coverage areas associated with macro cell base station 260 and HNBs 210 can be substantially different from each other; in particular, macro cell base station 260 can be associated with a large coverage area, while HNBs 210 can each be associated with a small coverage area. Based upon downlink considerations, it can be advantageous for mobile device 220 to connect to a base station (e.g., macro cell base station 260, HNBs 210, . . . ) with a strongest received downlink signal power. In contrast, on the uplink, a received uplink power level at a base station can be a function of attenuation due to path loss. Thus, uplink coverage of a base station can be based upon path loss and antenna gain, rather than transmit power of the base station. Accordingly, a mismatch between downlink cell boundaries/coverage areas and uplink cell boundaries/coverage areas can exist in heterogeneous networks such as system 200.

In various scenarios, it can be desirable for mobile device 220 to connect to a base station that is associated with a lower path loss as compared to a base station with a stronger received downlink signal power; however, the base station with the stronger received downlink signal power can cause significant interference to mobile device 220 (e.g., the base station with the stronger received downlink signal power can be a dominant interferer to mobile device 220, . . . ). For example, connecting mobile device 220 to a base station having a lower path loss can be beneficial for overall network performance since cell splitting gains can provide enhanced frequency reuse. Following this example, macro cell base station 260 can cover a region, which can also be covered by a plurality of HNBs 210. If mobile device 220 connects to a closest one of HNBs 210 rather than macro cell base station 260 using a given frequency, such frequency can be reused by disparate HNB(s) 210, where the closest one of the HNBs 210 and the disparate HNB(s) 210 are within a coverage region of macro cell base station 260. On the contrary, if mobile device 220 connects to macro cell base station 260 utilizing the given frequency, then such frequency can be unable to be reused within the coverage region of macro cell base station 260.

According to another illustration, differential rate plans can be utilized in system 200; based upon such plans, mobile device 220 can preferentially connect to a first type of base station versus a second type of base station. For example, an account associated with mobile device 220 can be billed based upon an amount of usage time when mobile device 220 connects to macro cell base station 260 (e.g., to effectuate voice calls, . . . ), while time connected to HNB(s) 210 can be included as part of a flat fee arrangement. Pursuant to this example, when in range of HNB(s) 210, mobile device 220 can attempt to connect to HNB(s) 210 rather than macro cell base station 260, even if mobile device 220 identifies that a stronger received downlink signal power is obtained from macro cell base station 260 as compared to a received downlink signal power obtained from HNB(s) 210 with which mobile device 220 is attempting to connect. Thus, macro cell base station 260 can be a dominant interferer to mobile device 220.

By way of a further example, macro cell base station 260 and a neighboring HNB (e.g., one of HNBs 210, . . . ) can have at least partially overlapping coverage regions. Mobile device 220 can recognize that the neighboring HNB can have a stronger received downlink signal power as compared to macro cell base station 260. However, mobile device 220 can be unable to connect with the neighboring HNB if the neighboring HNB is a restricted association base station that inhibits access by mobile device 220. A base station with restricted association may disallow a subset of mobile devices from connecting thereto (or allow only a subset of mobile devices to connect thereto), and mobile device 220 can be one of the disallowed mobile devices in the subset. For instance, the neighboring HNB with restricted association can be installed inside a home of a neighbor, and can allow only mobile device(s) associated with user(s) living in the home to connect (e.g., access, . . . ) thereto. Further, for instance, the neighboring HNB can be a dominant interferer to mobile device 220.

System 200 can mitigate interference introduced by a dominant interferer to mobile device 220. For instance, system 200 can support a mechanism that can be leveraged by mobile device 220 for indicating presence of a dominant interferer to a serving base station as part of an access probe. Moreover, the serving base station can utilize received information concerning presence of the dominant interferer to mitigate downlink interference for subsequent downlink transmissions (e.g., access grant, subsequent access related messages, . . . ). Although system 200 describes an example environment that includes macro cell base stations and femto cell base stations, it is to be appreciated that the aforementioned illustrations can be extended to heterogeneous environments that include substantially any types of base stations.

Figure 3:
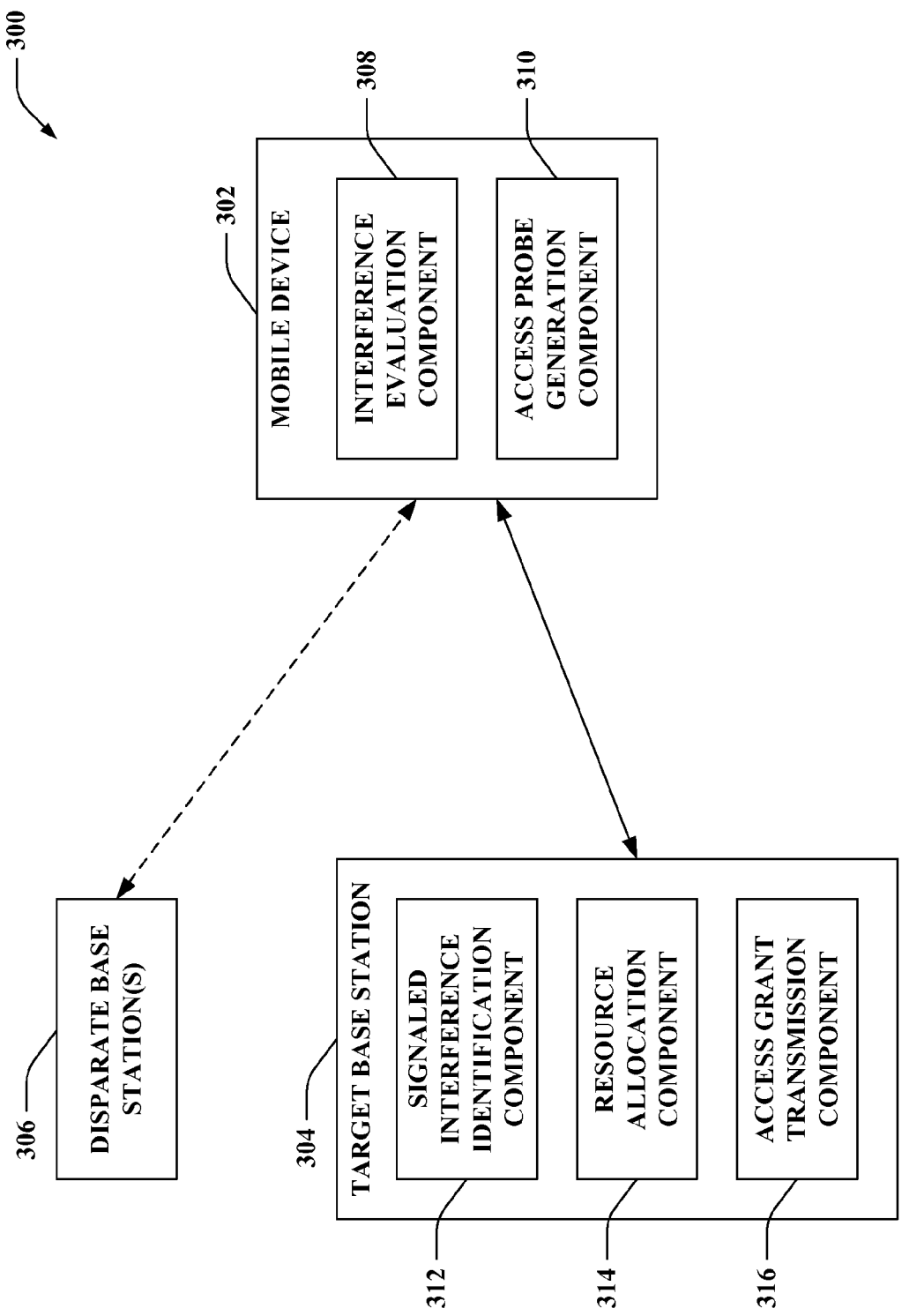
FIG. 3 is an illustration of an example system that supports controlling interference caused by a dominant interferer in a wireless communication environment.

Referring to FIG. 3, illustrated is a system 300 that supports controlling interference caused by a dominant interferer in a wireless communication environment. System 300 includes a mobile device 302 that can transmit and/or receive information, signals, data, instructions, commands, bits, symbols, and the like. Mobile device 302 can communicate with a target base station 304 via the forward link and/or the reverse link. Target base station 304 can transmit and/or receive information, signals, data, instructions, commands, bits, symbols, and the like. Target base station 304 can be any type of base station (e.g. femto cell base station, pico cell base station, micro cell base station, macro cell base station, . . . ). Further, system 300 can include any number of disparate base station(s) 306, which can be substantially similar to target base station 304. It is to be appreciated that disparate base station(s) 306 can each be any type of base station (e.g. femto cell base station, pico cell base station, micro cell base station, macro cell base station, . . . ). Moreover, although not shown, it is contemplated that any number of mobile devices similar to mobile device 302 can be included in system 300.

Mobile device 302 can further include an interference evaluation component 308 and an access probe generation component 310. Interference evaluation component 308 can detect interference on the downlink. For instance, interference evaluation component 308 can measure strength of signals received from target base station 304 and disparate base station(s) 306. Based upon the measurements of the received signals, interference evaluation component 308 can identify whether one (or more) of disparate base station(s) 306 is a dominant interferer to mobile device 302. By way of example, interference evaluation component 308 can analyze signals obtained from target base station 304 and disparate base station(s) 306. Following this example, interference evaluation component 308 can recognize whether a received downlink signal power corresponding to a signal obtained from one or more of disparate base station(s) 306 is stronger than a received downlink signal power corresponding to a signal received from target base station 304. If the received downlink signal power associated with one or more of disparate base station(s) 306 is stronger than the received downlink signal power associated with target base station 304, then interference evaluation component 308 can recognize that such disparate base station(s) 306 is a dominant interferer to mobile device 302. Moreover, if the received downlink signal power associated with target base station 304 is stronger than the received downlink signal power corresponding to disparate base station(s) 306, then interference evaluation component 308 can identify a lack of a dominant interferer. It is further contemplated that any disparate threshold can be utilized by interference evaluation component 308 to recognize a dominant interferer, and the claimed subject matter is not limited to identifying a dominant interferer based upon a determination concerning whether a strongest received signal power is associated with a signal sent from target base station 304 or one of disparate base station(s) 306.

Further, access probe generation component 310 can yield an access probe for transmission to target base station 304. In wireless communication environments, mobile devices such as mobile device 302 can access a network by transmitting an access signal usually referred to as an access probe (e.g., also referred to as an access sequence, access preamble, . . . ). The access probe can be outputted by access probe generation component 310 and can be targeted to a specific base station (e.g., target base station 304, . . . ). For instance, target base station 304 can be selected by mobile device 302 as its serving base station based on an optimality criterion such as maximum received downlink signal power, minimum path loss, and the like. According to another example, target base station 304 can be specified to mobile device 302 as part of a broadcast, in which case the serving base station selection can be performed by the access network. Further, target base station 304 can respond to the access attempt by mobile device 302 by sending an access grant signal that can indicate resources for subsequent access exchange.

An access probe yielded by access probe generation component 310 can carry a payload. The payload, for instance, can include a Channel Quality Indicator (CQI) value corresponding to target base station 304. Further, the CQI value can be provided to target base station 304 to enable efficient power control of access grant signals sent by target base station 304. Moreover, the CQI value can be generated by mobile device 302 (e.g. by interference evaluation component 308, a CQI analysis component (not shown), . . . ) based on measurements of acquisition signals from different base stations (e.g., target base station 304, disparate base station(s) 306, . . . ).

Access probe generation component 310 can indicate presence or absence of a dominant interferer as identified by interference evaluation component 308 in the access probe. The indication of presence or absence of a dominant interferer can be conveyed as part of the access probe yielded by access probe generation component 310 in substantially any manner. For instance, access probe generation component 310 can set an explicit flag (e.g., one bit, more than one bit, . . . ), where the value of the explicit flag is a function of whether or not presence of a dominant interferer has been identified by interference evaluation component 308. According to another example, access probe generation component 310 can include an explicit indication of an observed interference level as identified by interference evaluation component 308 in the payload of the outputted access probe. Pursuant to a further example, one or more CQI values can be reserved to signify presence of a dominant interferer; thus, access probe generation component 310 can include a reserved CQI value in the payload of the access probe to indicate presence of a dominant interferer. It is to be appreciated, however, that the claimed subject matter is not so limited.

Access probe generation component 310 can yield the access probe in various scenarios. For example, access probe generation component 310 can generate the access probe as a result of initial access. Following this example, mobile device 302 can awake from idle mode and select to connect to target base station 304 on its own, thus causing access probe generation component 310 to yield the access probe for transmission to target base station 304. According to another example, access probe generation component 310 can yield the access probe as a result of handoff initiated by mobile device 302, where mobile device 302 is connected to one of disparate base station(s) 306 and detects that it is beneficial to connect (e.g., handover, . . . ) to target base station 304. By way of further example, access probe generation component 310 can generate the access probe based upon radio link failure; thus, if mobile device 302 is connected to one of disparate base station(s) 306 and that connection fails (e.g., due to a change in radio conditions, . . . ), then mobile device 302 can attempt to connect to target base station 304 by sending the access probe yielded by access probe generation component 310 to target base station 304. In accordance with another example, access probe generation component 310 can yield the access probe as a result of network initiated handoff. Pursuant to this example, mobile device 302 can be connected to one of disparate base station(s) 306. Thereafter, the network can detect that it is beneficial for mobile device 302 to connect to target base station 304 and can direct mobile device 302 to access such target base station 304; in response to the direction by the network, access probe generation component 310 can yield the access probe for transmission to target base station 304.

Target base station 304 can receive the access probe transmitted by mobile device 302. Target base station 304 can further include a signaled interference identification component 312, a resource allocation component 314, and an access grant transmission component 316. Signaled interference identification component 312 can evaluate the received access probe to recognize whether access probe generation component 310 has indicated that mobile device 302 is in the presence of a dominant interferer. According to an illustration, signaled interference identification component 312 can recognize whether an explicit flag included in the received access probe is set to a value corresponding to signify presence or absence of a dominant interferer. Pursuant to a further example, signaled interference identification component 312 can recognize an explicit indication of an observed interference level carried in a payload of the access probe, and can decipher whether a dominant interferer is present based upon the observed interference level. Further, signaled interference identification component 312 can identify whether a reserved CQI value is included in a payload of the received access probe, where the reserved CQI value indicates presence of a dominant interferer. It is contemplated, yet, that the claimed subject matter is not limited to the foregoing examples.

Moreover, resource allocation component 314 can select resource(s) to be utilized by target base station 304 for communicating with mobile device 302 as a function of interference related indication(s) recognized by signaled interference identification component 312. For example, the selected resource(s) can be employed for sending an access grant to mobile device 302 in response to the received access probe. Additionally or alternatively, the selected resource(s) can be utilized for transmitting subsequent access related messages to mobile device 302.

Resource allocation component 314 can use the indication(s) identified by signaled interference identification component 312 to decide on time-frequency resource(s) to be employed for transmitting the access grant signal and/or subsequent access exchange. For instance, resource allocation component 314 can utilize a predetermined rule for allotting the resource(s) as a function of the indication(s) recognized from the access probe. Pursuant to another example, resource allocation component 314 can select the resource(s) based on information that target base station 304 has received from and/or sent to another network entity and/or neighboring base station(s) (e.g., disparate base station(s) 306, . . . ) concerning resources that are reserved for target base station 304 and/or a power class to which target base station 304 belongs. Following this example, the information can be communicated over a backhaul.

In heterogeneous networks, high power base stations (e.g., macro cell base stations, . . . ) can reserve certain time-frequency resources (e.g. a number of interlaces in a synchronous network, a number of subbands in an asynchronous network, . . . ) for lower power base stations (e.g., femto cell base stations, pico cell base stations, . . . ) within the coverage area of the high power base stations. Similarly, transmissions of femto cell base stations with restricted association can be limited to a certain set of resources to allow forward link transmissions of the macro cell base stations on other resources to reach mobile device(s) communicating with the macro cell base stations that are in vicinity of the restricted femto cell base stations. Accordingly, upon identifying that mobile device 302 is in the presence of a dominant interferer on the downlink, resource allocation component 314 can allot reserved resources to be utilized for transmission of an access grant signal and/or subsequent access exchange, thereby enhancing such messages reaching their intended destinations.

Moreover, access grant transmission component 316 can send the access grant signal utilizing the resources as allotted by resource allocation component 314. Further, access grant transmission component 316 can transmit the subsequent access related messages employing the resource assigned by resource allocation component 314.

According to an example scenario, interference evaluation component 308 can recognize that a femto cell base station with restricted association (e.g. one of disparate base station(s) 306, . . . ) is within close proximity thereto and is a dominant interferer on the downlink to mobile device 302. Hence, access probe generation component 310 can indicate presence of the femto cell base station, which is a dominant interferer, by incorporating corresponding information in a payload of an access probe. Such information can be conveyed in several ways, examples of which include an explicit flag, an explicit indication of the observed interference level, or inclusion of one or more reserved CQI values in the payload of the access probe. In this case, mobile device 302 can be near a restricted association femto cell base station (e.g., one of disparate base station(s) 306, . . . ) and can access target base station 304, which can be a macro cell base station. Further, mobile device 302 can use one or more of the above indications to indicate the dominant interference situation to target base station 304. Such indications can serve as a request for target base station 304 to transmit an access grant signal and/or subsequent access related messages on a resource on which restricted association femto cell base stations are not allowed to transmit. It is to be appreciated, however, that the claimed subject matter is not limited to the foregoing example scenario.

Pursuant to a further example scenario (e.g., range extension scenario, . . . ), mobile device 302 can have a smaller path loss to a low power base station (e.g., target base station 304, femto cell base station, pico cell base station, . . . ) and can attempt to access such low power base station. However, forward link signals from a high power base station (e.g., one of disparate base station(s) 306, macro cell base station, . . . ) can be significantly stronger than forward link signals from the low power base station as recognized by interference evaluation component 308. In this case, forward link transmissions of the high power base station can cause severe interference to access grant signals from the low power base station (e.g. target base station 304, . . . ). Accordingly, access probe generation component 310 can convey this information by including an explicit flag, an explicit indication of the observed interference level, or one or more reserved CQI values in the payload of the access probe. Mobile device 302 can use one or more of these indications to signify this situation to the low power base station (e.g., target base station 304, . . . ) being accessed thereby. The indications can serve as a request that the low power base station transmits an access grant signal and/or subsequent access related messages on those resources that are reserved for low power base station(s) by the high power base station(s). Yet, it is contemplated that the claimed subject matter is not limited to the aforementioned example scenario.

Figure 4:
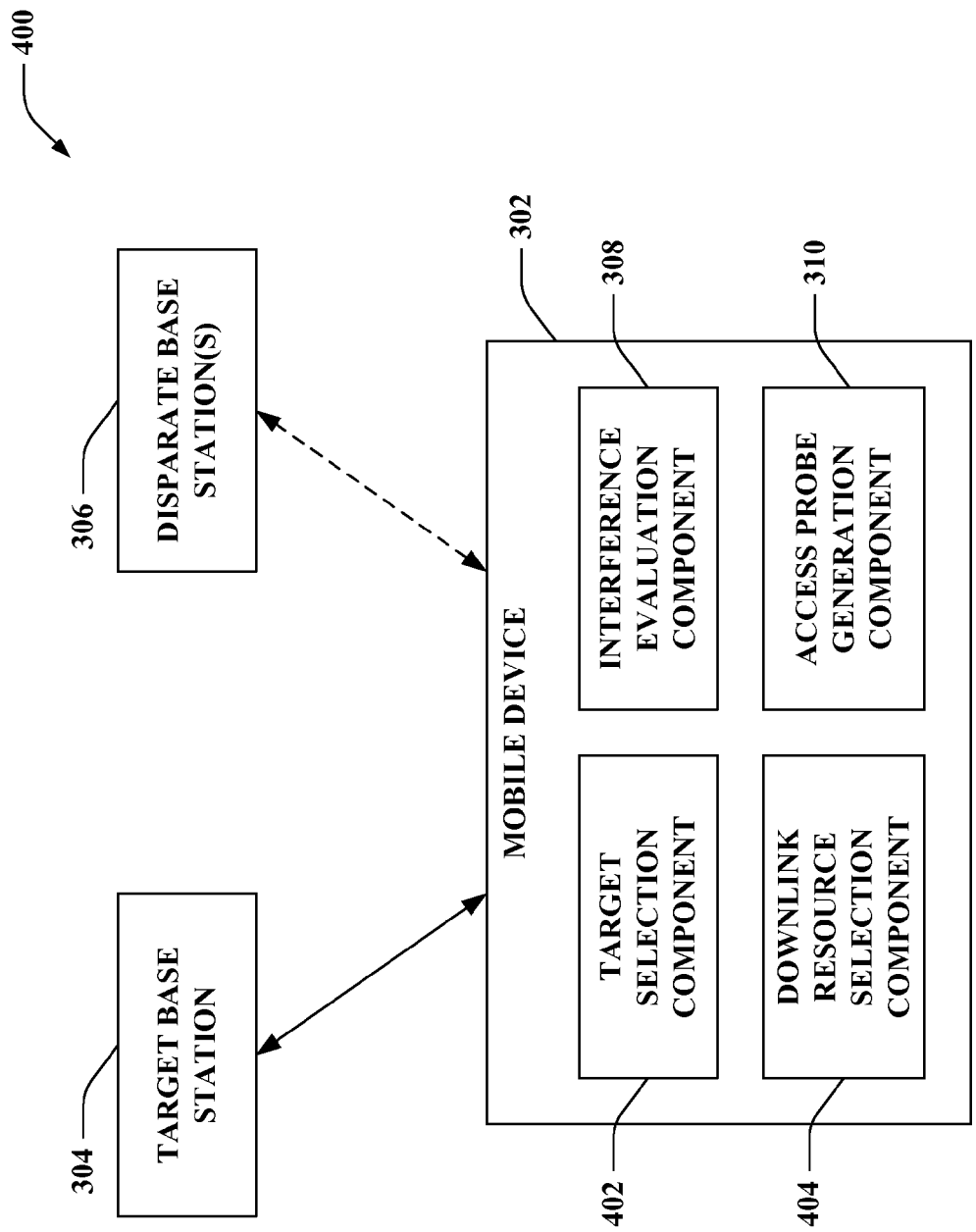
FIG. 4 is an illustration of an example system that feeds back control resource information to utilize for downlink access related transmissions in a wireless communication environment.

Now referring to FIG. 4, illustrated is an example system 400 that feeds back control resource information to utilize for downlink access related transmissions in a wireless communication environment. System 400 includes mobile device 302, target base station 304 and disparate base station(s) 306. Mobile device 302 can further include interference evaluation component 308, which can analyze downlink interference levels. For instance, interference evaluation component 308 can monitor downlink signal strength associated with transmissions from target base station 304 and/or disparate base station(s) 306. Moreover, interference evaluation component 308 can recognize whether one or more of disparate base station(s) 306 is a dominant interferer to mobile device 302. Further, mobile device 302 can include access probe generation component 310, which can yield an access probe based upon the interference related information obtained by interference evaluation component 308. Access probe generation component 310, for instance, can convey the interference related information as part of a payload of the access probe.

Moreover, mobile device 302 can include a target selection component 402 that can choose a particular base station to be a serving base station for mobile device 302. Hence, target selection component 402 can select target base station 304 from a set of possible base station (e.g., the set of possible base stations can also include disparate base station(s) 306, . . . ). Target selection component 402 can choose target base station 304 as a function of received downlink signal power (e.g., maximum received downlink signal power, . . . ), path loss (e.g., minimum path loss, . . . ), and the like. Upon yielding a selection with target selection component 402, mobile device 302 can initiate accessing target base station 304 (e.g., via sending an access probe yielded by access probe generation component 310, . . . ). Although not shown, according to another example, selection of target base station 304 as a serving base station for mobile device 302 can be effectuated by an access network; such selection can thereafter be disseminated to mobile device 302, and accessing of target base station 304 can be effectuated in response thereto.

Further, mobile device 302 can include a downlink resource selection component 404 that analyzes observed downlink interference on a set of possible downlink control resources. Based upon the analysis, downlink resource selection component 404 can choose downlink control resources from the set that have lower observed downlink interference. Thus, pursuant to an example, mobile device 302 can attempt to access target base station 304, which can be a macro cell base station, while located near disparate base station(s) 306, which can include a femto cell base station. Alternatively, mobile device 302 can attempt to access target base station 304, which can be a low power base station (e.g. femto cell base station, pico cell base station, . . . ), while located in a range extension region of disparate base station(s) 306 (e.g., range extension region of a macro cell base station, . . . ). Under either scenario, downlink resource selection component 404 can identify a resource (e.g., a time interlace, a frequency subband, . . . ) on which it wishes to receive the access grant signal and/or subsequent access exchange from target base station 304. Downlink resource selection component 404 can select the resource based on reserved resources information that can be received from dominant interferer base station(s) (e.g., one or more of disparate base station(s) 306, . . . ) of mobile device 302. According to another example, downlink resource selection component 404 can choose the resource as a function of a measurement of the observed interference on different time-frequency resources. Moreover, the chosen resource can be included as part of the access probe sent to target base station 304 as yielded by access probe generation component 310. Target base station 304 can utilize this information, possibly together with other information that it can acquire through other mechanisms (e.g., via the backhaul, . . . ) to select a resource on which the access grant signal and/or the subsequent access exchange is transmitted by target base station 304 to mobile device 302.

Figure 5:
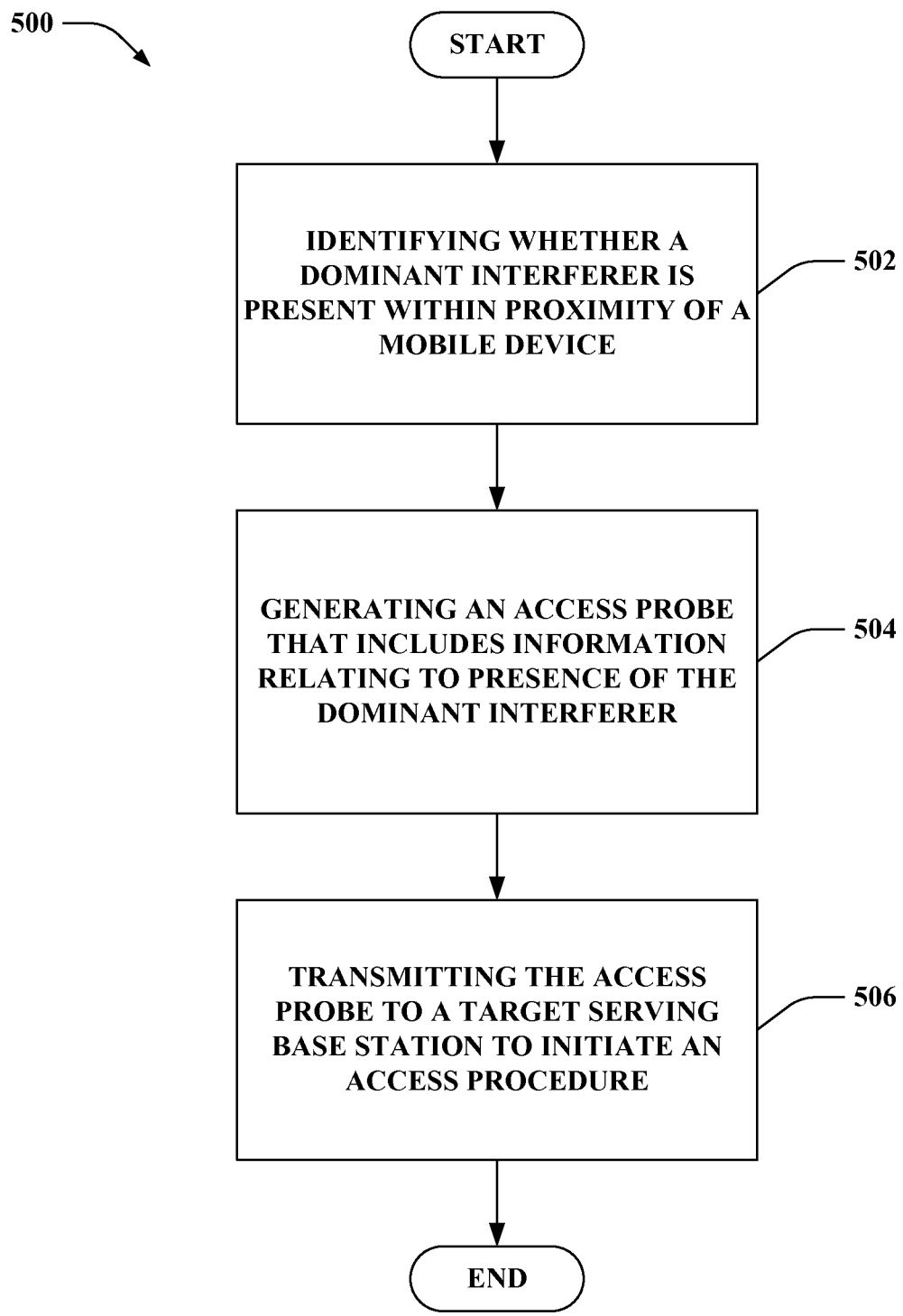
FIG. 5 is an illustration of an example methodology that facilitates indicating presence of a dominant interferer in a wireless communication environment.
Figure 6:
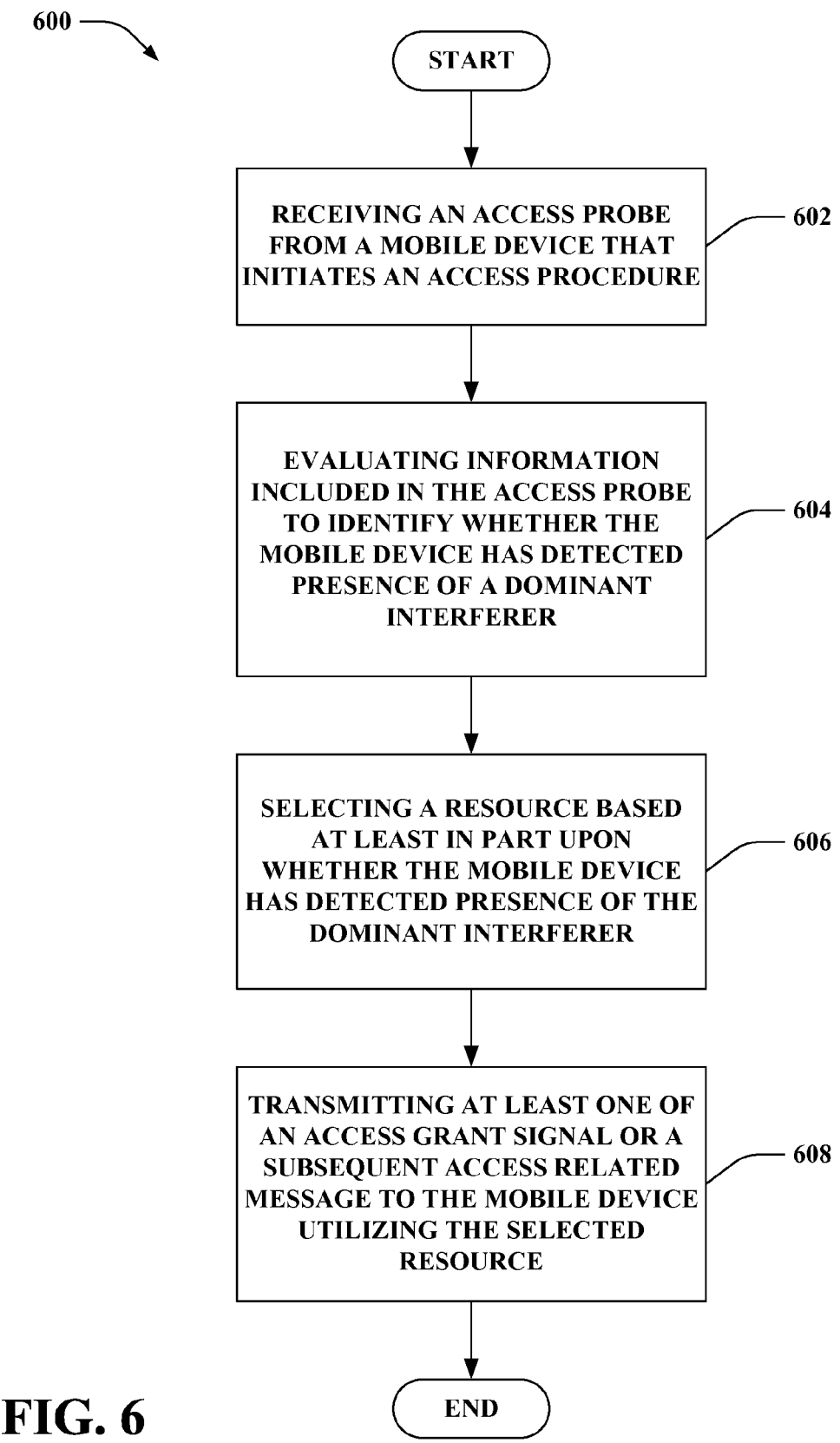
FIG. 6 is an illustration of an example methodology that facilitates utilizing feedback concerning presence of a dominant interferer in a wireless communication environment.
Figure 7:
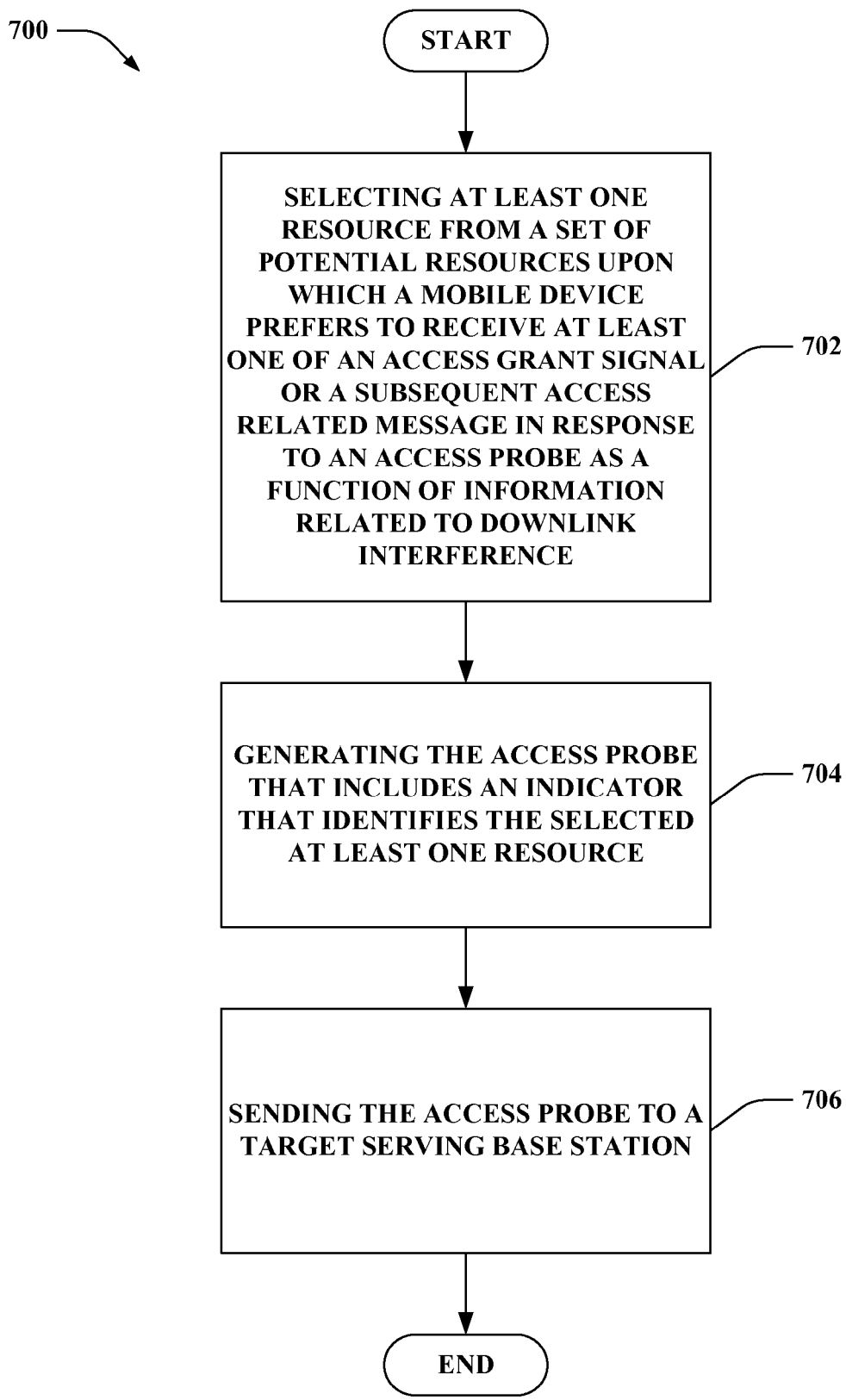
FIG. 7 is an illustration of an example methodology that facilitates specifying one or more resources to utilize for downlink transmission based upon interference related information in a wireless communication environment.

Referring to FIGS. 5-7, methodologies relating to signifying presence or absence of a dominant interferer to a target serving base station (e.g., target base station, . . . ) in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates indicating presence of a dominant interferer in a wireless communication environment. At 502, whether a dominant interferer is present within proximity of a mobile device can be identified. A dominant interferer can be recognized as a base station that causes significant downlink interference as monitored by the mobile device. For instance, presence of a dominant interferer can be identified upon detecting that a received downlink signal power corresponding to a signal obtained from a non-serving base station is stronger than a received downlink signal power corresponding to a signal received from a target serving base station. Alternatively, absence of a dominant interferer can be recognized when a signal received from the target serving base station is detected to be associated with a highest received downlink signal power. According to an example, a dominant interferer can be identified to be present when the target serving base station to which the mobile device attempts to connect is a lower power base station (e.g., femto cell base station, pico cell base station, . . . ) as compared to the non-serving base station (e.g., macro cell base station, . . . ), and the mobile device has a smaller path loss to the lower power base station in comparison to the non-serving base station. Further, following this example, downlink signals received by the mobile device from the non-serving base station can be significantly stronger than downlink signals received from the lower power base station. Pursuant to another example, presence of a dominant interferer can be recognized when the mobile device is near a restricted association femto cell base station (e.g., to which the mobile device is prohibited from accessing, . . . ) with a strongest corresponding channel, and the mobile device is attempting to access a disparate base station (e.g., macro cell base station, . . . ).

At 504, an access probe that includes information relating to presence of the dominant interferer can be generated. For instance, the information relating to presence of the dominant interferer can be conveyed in at least part of a payload of the access probe. According to an example, an explicit flag (e.g., one bit, more than one bit, . . . ) in the payload of the access probe can be set as a function of presence or absence of the dominant interferer. Pursuant to another illustration, an explicit indication of an observed interference level can be included in the payload of the access probe. By way of further example, a reserved Channel Quality Indicator (CQI) value can be included in the payload of the access probe to signify presence of the dominant interferer, while a non-reserved CQI value (e.g., corresponding to a measurement, . . . ) can be incorporated in the payload of the access probe to indicate absence of the dominant interferer. In accordance with another example, downlink interference levels associated with a set of potential resources can be measured, and at least one resource from the set can be selected based upon the measured downlink interference levels (e.g., the at least one resource from the set can be monitored to be associated with a low downlink interference level, . . . ); further, the access probe can include an indicator that specifies the selected at least one resource on which the mobile device prefers to receive an access grant and/or subsequent access related messages.

At 506, the access probe can be transmitted to the target serving base station to initiate an access procedure. By way of illustration, the target serving base station can be selected by the mobile device based upon an optimality criterion such as, for instance, maximum received downlink signal power, minimum path loss, and so forth. Pursuant to a further illustration, the target serving base station can be selected by an access network, and a broadcasted indication related to such selection can be received by the mobile device. In accordance with another example, the access probe can be generated for transmission to the target serving base station as a result of at least one of initial access by the mobile device, handoff initiated by the mobile device, radio link failure or network initiated handoff. In response to the access probe, an access grant and/or subsequent access related messages can be received from the target serving base station. Moreover, a resource utilized for sending the access grant and/or the subsequent access related messages over the downlink can be chosen by the target serving base station as a function of the information relating to presence of the dominant interferer included in the access probe.

Now referring to FIG. 6, illustrated is a methodology 600 that facilitates utilizing feedback concerning presence of a dominant interferer in a wireless communication environment. At 602, an access probe from a mobile device that initiates an access procedure can be received. The access probe can carry a payload that includes a Channel Quality Indicator (CQI) value, for instance. At 604, information included in the access probe can be evaluated to identify whether the mobile device has detected presence of a dominant interferer. A dominant interferer can be a non-serving base station that causes significant downlink interference to the mobile device. Further, the information can be included in at least part of a payload of the access probe. For example, a value of an explicit flag (e.g., one bit, more than one bit, . . . ) in the payload of the access probe can be discerned to recognize presence or absence of the dominant interferer. Pursuant to another example, an explicit indication of an observed interference level can be obtained from the payload of the access probe, and presence or absence of the dominant interferer can be recognized based upon the observed interference level. In accordance with another illustration, a CQI value included in the payload can be analyzed such that presence of the dominant interferer can be recognized when the CQI value included in the payload matches a reserved CQI value and absence of the dominant interferer can be identified when the CQI value included in the payload matches a non-reserved CQI value. By way of a further example, an indicator that specifies a preferred one or more resources from a set of possible resources requested to be utilized for subsequent downlink transmission can be deciphered from the information included in the access probe.

At 606, a resource can be selected based at least in part upon whether the mobile device has detected presence of the dominant interferer. The resource can be a time-frequency resource (e.g., time interlace, frequency subband, . . . ). For example, the resource can be chosen based on a predetermined rule. According to another illustration, the resource can be selected based upon negotiation with a disparate network entity or neighboring base station. Pursuant to a further example, the resource can be selected based at least in part upon a preferred one or more resources specified by the mobile device in the access probe. At 608, at least one of an access grant signal or a subsequent access related message can be transmitted to the mobile device utilizing the selected resource. The access grant signal can be responsive to the access probe, and can indicate resources for subsequent access exchange.

Turning to FIG. 7, illustrated is a methodology 700 that facilitates specifying one or more resources to utilize for downlink transmission based upon interference related information in a wireless communication environment. At 702, at least one resource from a set of potential resources upon which a mobile device prefers to receive at least one of an access grant signal or a subsequent access related message in response to an access probe can be selected as a function of information related to downlink interference. For example, downlink interference levels associated with the set of potential resources can be measured to yield the information related to downlink interference, which can be utilized to effectuate the selection of the at least one resource. Following this example, the mobile device can directly measure interference on different potential resources in the set to determine a subset of the resources that are suitable for subsequent communication. According to another example, the mobile device can receive broadcasted information concerning a subset of resources reserved for a lower power base station (e.g., femto cell base station, pico cell base station, . . . ). Pursuant to this example, the mobile device can receive the broadcasted information concerning the subset of reserved resources from a macro cell base station and/or the lower power base station. Further, the received information concerning the subset of reserved resources can be utilized to select the at least one resource. For instance, if the macro cell base station broadcasts information identifying resources set aside for use by lower power base stations, then the mobile device can select the at least one resource based thereupon. According to another illustration, if the mobile device experiences interference from a lower power base station, then the mobile device can read a broadcast channel from the lower power base station to determine which subset of resources it is using (and/or which resources it is setting aside), and the selection can be effectuated based at least in part upon such information.

At 704, the access probe that includes an indicator that identifies the selected at least one resource can be generated. For instance, the indicator can be an interlace identifier (ID) encoded in the access probe. The interlace ID, for example, can identify an interlace that is free of interference. Further, the interlace ID can identify an interlace preferred to be used for the access grant signal and/or subsequent access related message. Moreover, an interlace can include a periodic set of subframes; for instance, an interlace can include every Xth subframe, where X can be substantially any integer (e.g., X can be 8, X can be an integer less than 8, X can be an integer greater than 8, . . . ). Further, the indicator can be a set of interlace IDs encoded in the access probe, where the set of interlace IDs correspond to a set of interlaces that are free of interference. According to a further example, the indicator incorporated in the access probe can signify a specific subframe (or subframes) expected to be free of interference which can be preferred to be used to transmit the access grant signal and/or subsequent access related message. Additionally or alternatively, the access probe can include information relating to presence of a dominant interferer. At 706, the access probe can be sent to a target serving base station.

It will be appreciated that, in accordance with one or more aspects described herein, inferences can be made regarding indicating a dominant interferer via an access probe in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining whether a dominant interferer is present or absent. By way of further illustration, an inference can be made related to selecting a base station to be a target serving base station for a mobile device. It will be appreciated that the foregoing examples are illustrative in nature and are not intended to limit the number of inferences that can be made or the manner in which such inferences are made in conjunction with the various embodiments and/or methods described herein.

Figure 8:
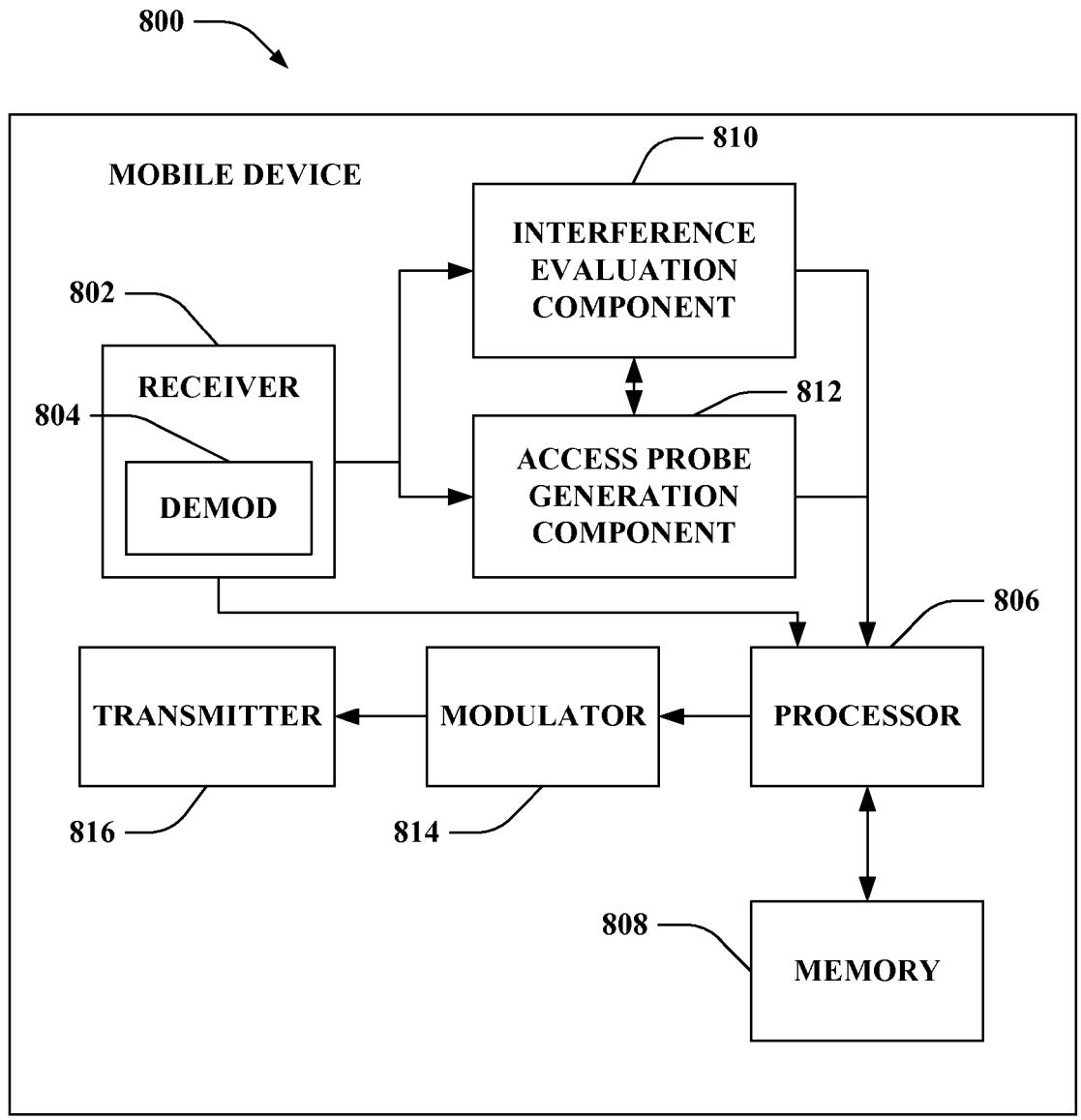
FIG. 8 is an illustration of an example mobile device that provides notification regarding presence or absence of a dominant interferer to a target serving base station in a wireless communication system.

FIG. 8 is an illustration of a mobile device 800 that provides notification regarding presence or absence of a dominant interferer to a target serving base station in a wireless communication system. Mobile device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, and any other suitable information related to performing the various actions and functions set forth herein. Memory 808, for instance, can store protocols and/or algorithms associated with identifying presence of a dominant interferer based upon evaluation of downlink interference levels. Further, memory 808 can store protocols and/or algorithms associated with feeding back information related to the presence or absence of the dominant interferer to a target serving base station as part of an access probe.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to an interference evaluation component 810 and/or an access probe generation component 812. Interference evaluation component 810 can be substantially similar to interference evaluation component 308 of FIG. 3 and/or access probe generation component 812 can be substantially similar to access probe generation component 310 of FIG. 3. Interference evaluation component 810 can recognize whether a dominant interferer is present or absent as described herein. Moreover, access probe generation component 812 can yield an access probe that includes information related to the presence or absence of the dominant interferer. For instance, access probe generation component 812 can signify whether the dominant interferer is detected to be present in a payload of the access probe, which can be transmitted to a target serving base station to initiate an access procedure. Moreover, a responsive access grant and/or subsequent access related message can be obtained by mobile device 800 from the target serving base station via resources(s) selected as a function of information included in the access probe. Although not shown, it is contemplated that mobile device 800 can further include a target selection component (e.g., substantially similar to target selection component 402 of FIG. 4, . . . ) and/or a downlink resource selection component (e.g., substantially similar to downlink resource selection component 404 of FIG. 4, . . . ). Mobile device 800 still further comprises a modulator 814 and a transmitter 816 that transmits data, signals, etc. to a base station. Although depicted as being separate from the processor 806, it is to be appreciated that interference evaluation component 810, access probe generation component 812 and/or modulator 814 can be part of processor 806 or a number of processors (not shown).

Figure 9:
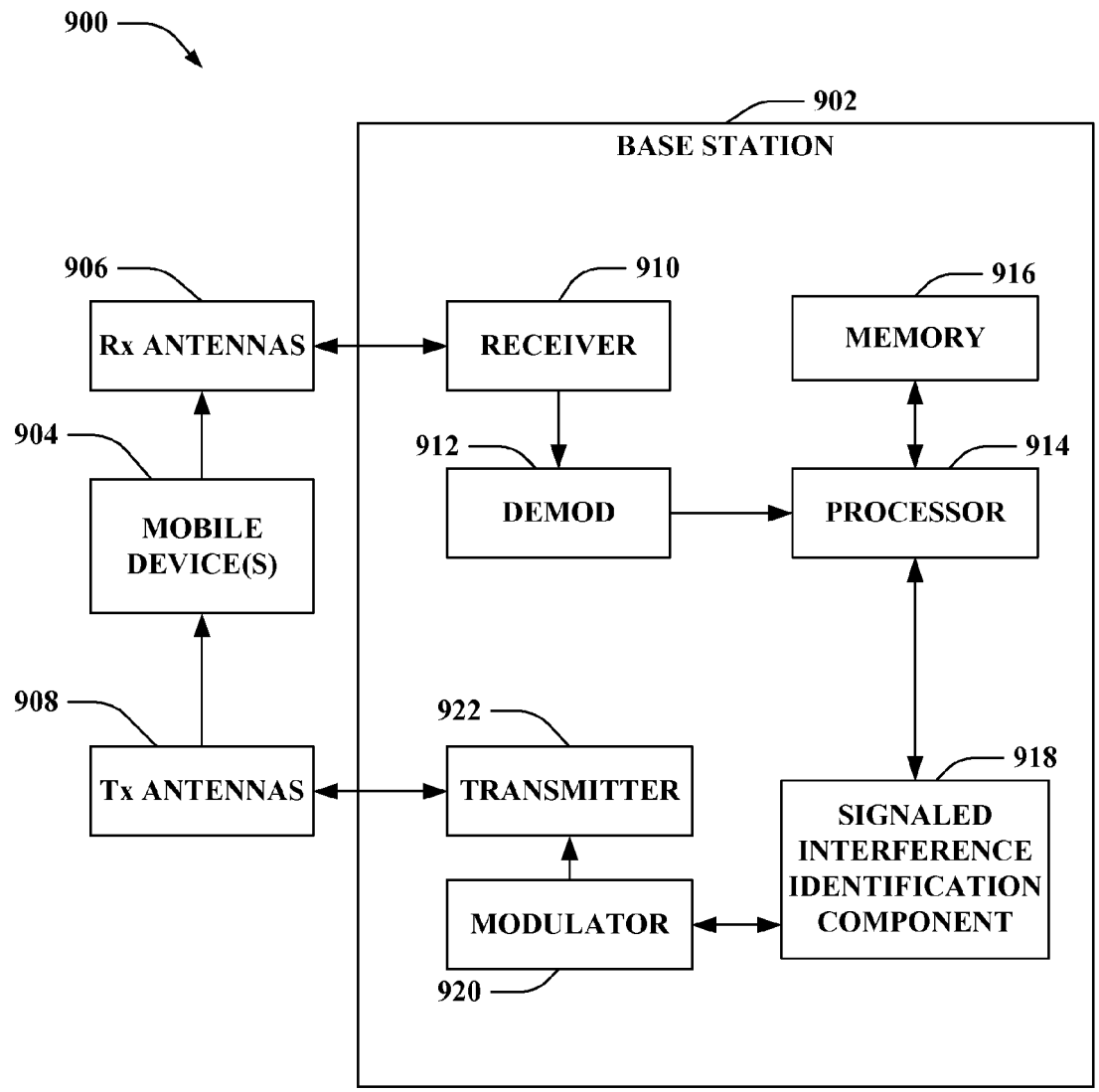
FIG. 9 is an illustration of an example system that obtains feedback concerning existence of a dominant interferer in a wireless communication environment.

FIG. 9 is an illustration of a system 900 that obtains feedback concerning existence of a dominant interferer in a wireless communication environment. System 900 comprises a base station 902 (e.g., access point, . . . ) with a receiver 910 that receives signal(s) from one or more mobile devices 904 through a plurality of receive antennas 906, and a transmitter 922 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from mobile device(s) 904 and/or any other suitable information related to performing the various actions and functions set forth herein. Processor 914 is further coupled to a signaled interference identification component 918 that analyzes an access probe received from mobile device 904 to detect whether mobile device 904 has indicated that a dominant interferer is present or absent. It is contemplated that signaled interference identification component 918 can be substantially similar to signaled interference identification component 312 of FIG. 3. Moreover, although not shown, it is to be appreciated that base station 902 can further include a resource allocation component (e.g., substantially similar to resource allocation component 314 of FIG. 3, . . . ) and/or an access grant transmission component (e.g., substantially similar to access grant transmission component 316 of FIG. 3, . . . ). Base station 902 can further include a modulator 920. Modulator 920 can multiplex a frame for transmission by a transmitter 922 through antennas 908 to mobile device(s) 904 in accordance with the aforementioned description. Although depicted as being separate from the processor 914, it is to be appreciated that signaled interference identification component 918 and/or modulator 920 can be part of processor 914 or a number of processors (not shown).

Figure 10:
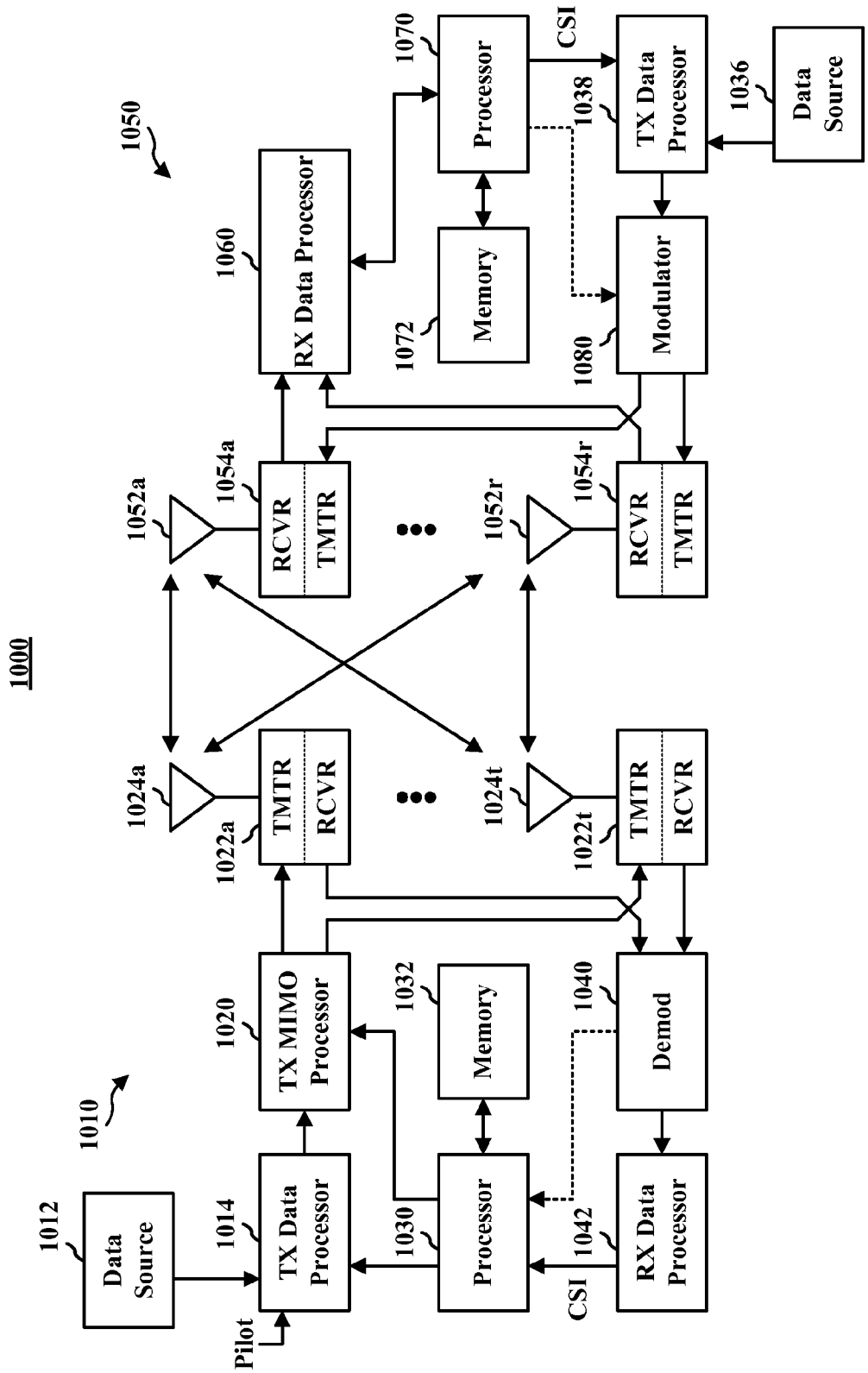
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4, 8-9 and 11-13) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which preceding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which preceding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
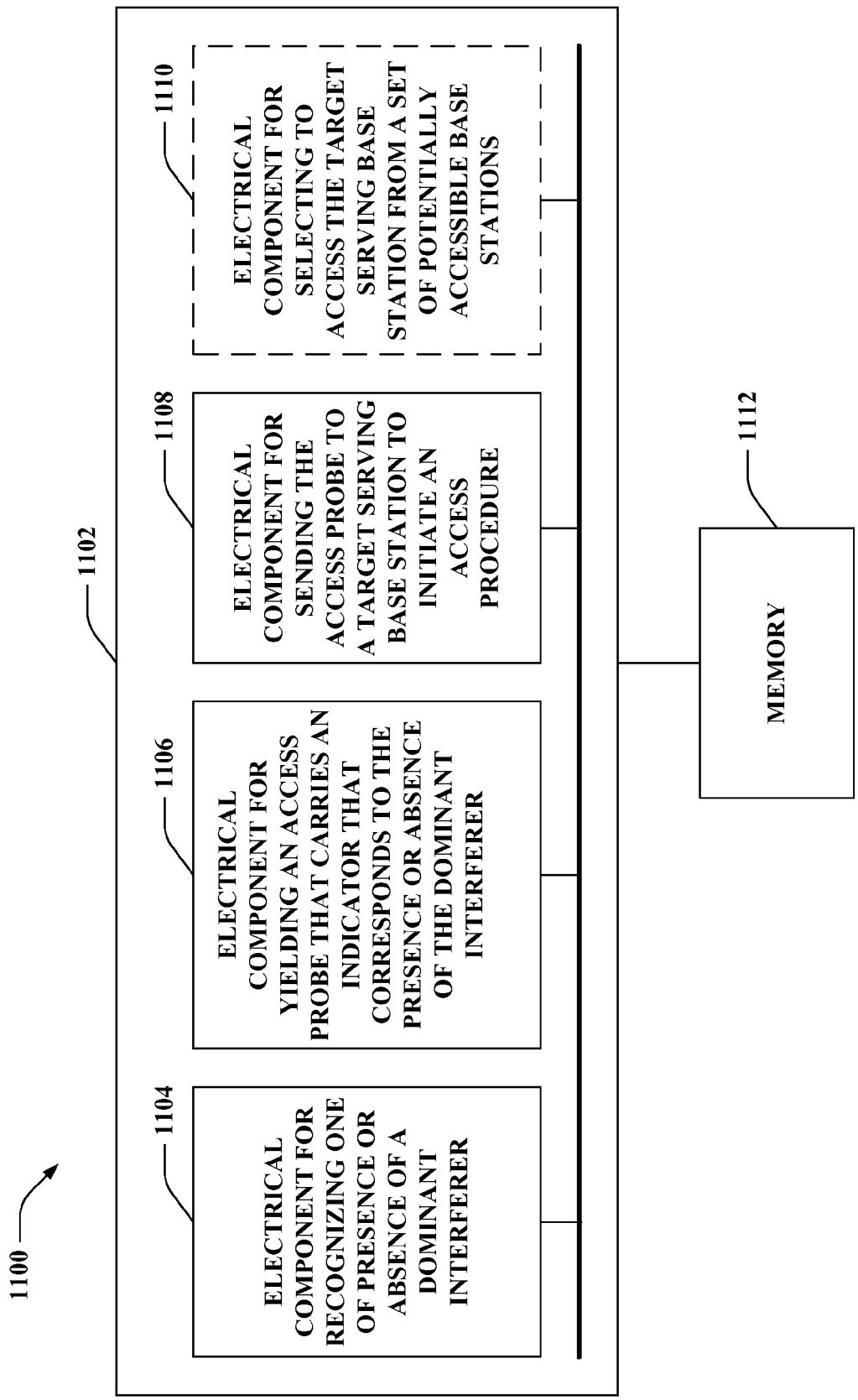
FIG. 11 is an illustration of an example system that enables signaling information related to a dominant interferer to a target serving base station in a wireless communication environment.

With reference to FIG. 11, illustrated is a system 1100 that enables signaling information related to a dominant interferer to a target serving base station in a wireless communication environment. For example, system 1100 can reside within a mobile device. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for recognizing one of presence or absence of a dominant interferer 1104. Moreover, logical grouping 1102 can comprise an electrical component for yielding an access probe that carries an indicator that corresponds to the presence or absence of the dominant interferer 1106. Further, logical grouping 1102 can include an electrical component for sending the access probe to a target serving base station to initiate an access procedure 1108. Logical grouping 1102 can also optionally include an electrical component for selecting to access the target base station from a set of potentially accessible base stations 1110. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
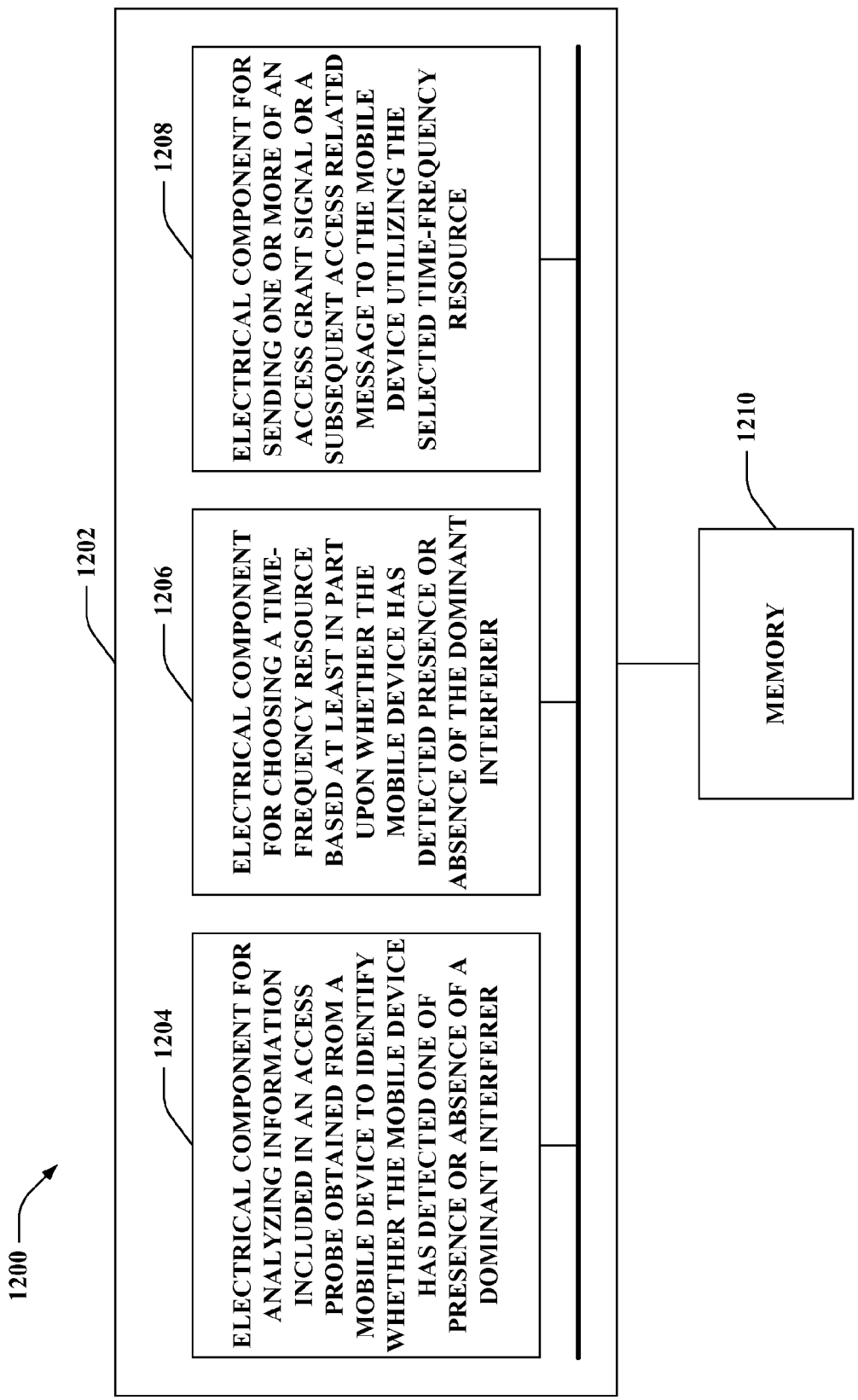
FIG. 12 is an illustration of an example system that enables utilizing dominant interferer related feedback in a wireless communication environment.

With reference to FIG. 12, illustrated is a system 1200 that enables utilizing dominant interferer related feedback in a wireless communication environment. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for analyzing information included in an access probe obtained from a mobile device to identify whether the mobile device has detected one of presence or absence of a dominant interferer 1204. Further, logical grouping 1202 can include an electrical component for choosing a time-frequency resource based at least in part upon whether the mobile device has detected presence or absence of the dominant interferer 1206. Moreover, logical grouping 1202 can include an electrical component for sending one or more of an access grant signal or a subsequent access related message to the mobile device utilizing the selected time-frequency resource 1208. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

Figure 13:
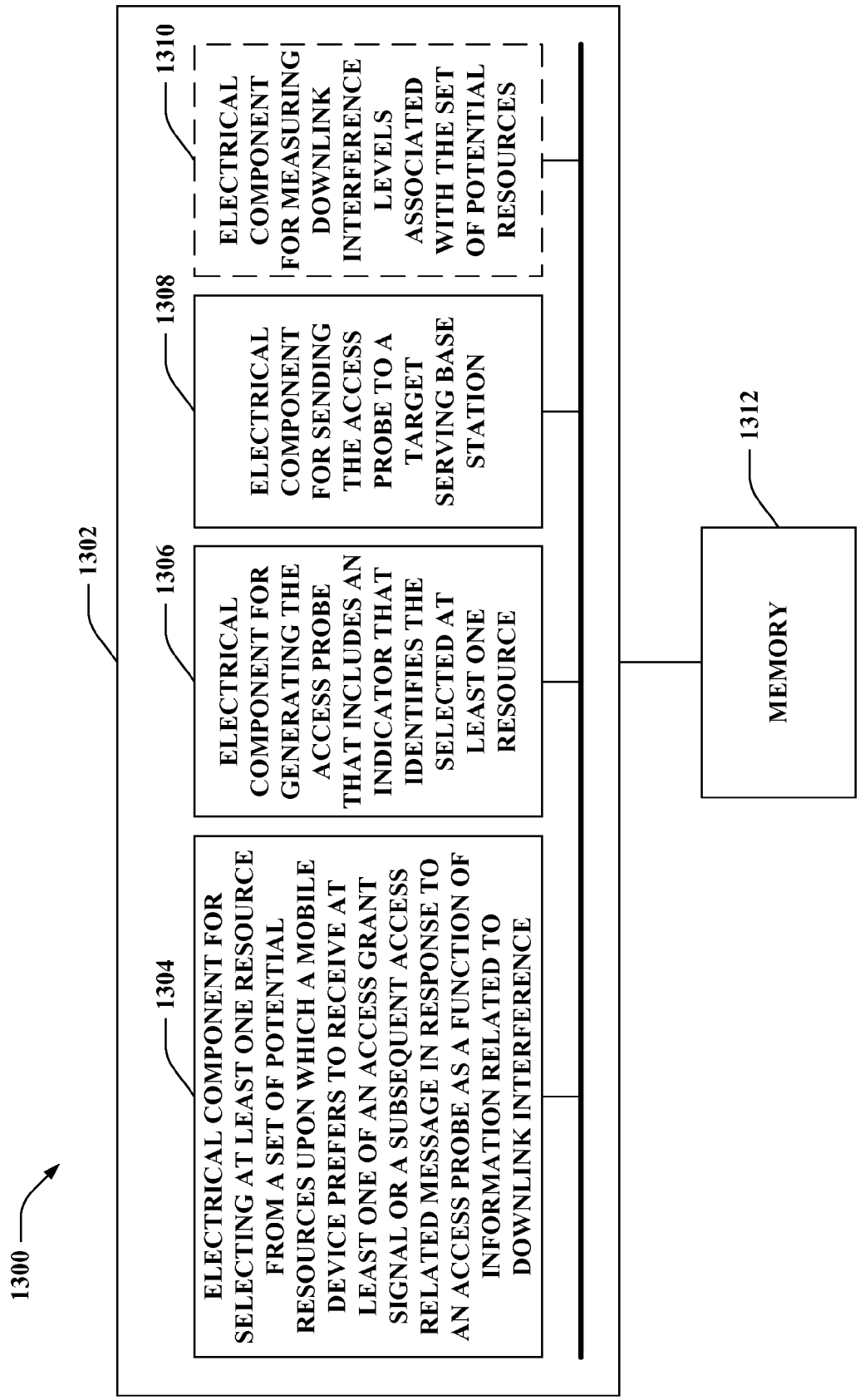
FIG. 13 is an illustration of an example system that enables signaling information related to selected resource(s) to a target serving base station in a wireless communication environment.

With reference to FIG. 13, illustrated is a system 1300 that enables signaling information related to selected resource(s) to a target serving base station in a wireless communication environment. For example, system 1300 can reside within a mobile device. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for selecting at least one resource from a set of potential resources which a mobile device prefers to receive at least one of an access grant signal or a subsequent access related message in response to an access probe as a function of information related to downlink interference 1304. Moreover, logical grouping 1302 can comprise an electrical component for generating the access probe that includes an indicator that identifies the selected at least one resource 1306. Further, logical grouping 1308 can include an electrical component for sending the access probe to a target serving base station 1308. Logical grouping 1302 can also optionally include an electrical component for measuring downlink interference levels associated with the set of potential resources 1310. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
   identifying, at a mobile device, whether a dominant interferer is present within proximity of the mobile device, the dominant interferer being identified based at least in part on downlink interference measured by the mobile device;
   measuring downlink interference levels associated with a set of resources of time interlaces or frequency subbands;
   selecting at least one resource of a particular time interlace or of a particular frequency subband from the set based on the measured downlink interference levels;
   generating an access probe that includes an interference indicator for indicating a presence of the dominant interferer, the access probe further including a resource indicator specifying the at least one resource of the particular time interlace or of the particular frequency subband, selected by the mobile device based on the measured downlink interference levels, on which to receive an access grant signal or a subsequent access related message from a target serving base station that is not currently serving the mobile device in response to the access probe; and
   transmitting the access probe to the target serving base station to initiate an access procedure to connect the mobile device from a currently serving base station to the target serving base station, the target base station being selected based at least in part on a signal quality between the mobile device and the target base station.

2. The method of claim 1, wherein the dominant interferer is a base station that causes downlink interference above a threshold as measured by the mobile device.

3. The method of claim 1, further comprising identifying presence of the dominant interferer upon detecting that a first received downlink signal power corresponding to a first signal obtained from a non-serving base station is stronger than a second received downlink signal power corresponding to a second signal received from the target serving base station.

4. The method of claim 1, further comprising determining an absence of the dominant interferer when a signal received from the target serving base station is detected to be associated with a highest received downlink signal power.

5. The method of claim 1, further comprising conveying the interference indicator in at least part of a payload of the access probe.

6. The method of claim 5, wherein the interference indicator is an explicit flag to indicate the presence or an absence of the dominant interferer.

7. The method of claim 5, wherein the interference indicator is an explicit indication of an observed interference level.

8. The method of claim 5, wherein the interference indicator is a reserved Channel Quality Indicator (CQI) value.

9. The method of claim 1, further comprising selecting the target serving base station based upon at least received downlink signal power or path loss.

10. The method of claim 1, further comprising generating the access probe for transmission to the target serving base station as a result of one or more of initial access by the mobile device, handoff initiated by the mobile device, radio link failure, network initiated handoff, or a combination thereof.

11. A wireless communications apparatus, the wireless communication apparatus being a mobile device, comprising:
at least one processor configured to:
detect, at the mobile device, a dominant interferer based upon downlink interference measured by the mobile device;
monitor downlink interference levels associated with a set of downlink time-frequency resources;
select at least one downlink time-frequency resource from the set based on the monitored downlink interference levels;
generate an access probe that includes an interference indicator for indicating a presence of the dominant interferer, the access probe further including a resource indicator specifying the at least one downlink time-frequency resource, selected by the mobile device based on the monitored downlink interference levels, on which to receive an access grant signal or a subsequent access related message from a target serving base station that is not currently serving the mobile device in response to the access probe; and
transmit the access probe to the target serving base station to initiate an access procedure to connect the mobile device from a currently serving base station to the target serving base station, the target base station being selected based at least in part on a signal quality between the mobile device and the target base station.

12. The wireless communications apparatus of claim 11, wherein the interference indicator is an explicit flag in a payload of the access probe.

13. The wireless communications apparatus of claim 11, wherein the interference indicator is an explicit indication of an observed interference level.

14. The wireless communications apparatus of claim 11, wherein the interference indicator is a Channel Quality Indicator (CQI) value, the CQI value is a reserved CQI value to signify presence of the dominant interferer or set to a non-reserved CQI value to specify absence of the dominant interferer.

15. The wireless communications apparatus of claim 11, in which the at least one processor is further configured to:
select the target serving base station based upon one or more of received downlink signal power, path loss, or a combination thereof.

16. An apparatus, the apparatus being a mobile device, comprising:
means for determining whether a dominant interferer is within proximity of the mobile device, the dominant interferer being identified based at least in part on downlink interference measured by the mobile device;
means for measuring downlink interference levels associated with a set of downlink time-frequency resources;
means for selecting at least one downlink time-frequency resource from the set based on the measured downlink interference levels;
means for generating an access probe that includes an interference indicator for indicating a presence of the dominant interferer, the access probe further including a resource indicator specifying the at least one downlink time-frequency resource, selected by the mobile device based on the measured downlink interference levels, on which to receive an access grant signal or a subsequent access related message from a target serving base station that is not currently serving the mobile device in response to the access probe; and
means for transmit the access probe to the target serving base station to initiate an access procedure to connect the mobile device from a currently serving base station to the target serving base station, the target base station being selected based at least in part on a signal quality between the mobile device and the target base station.

17. The apparatus of claim 16, wherein the interference indicator is an explicit flag in a payload of the access probe.

18. The apparatus of claim 16, wherein the interference indicator is an explicit indication of an observed interference level.

19. The apparatus of claim 16, wherein the interference indicator is a Channel Quality Indicator (CQI) value, the CQI value is a reserved CQI value to signify presence of the dominant interferer or set to a non-reserved CQI value to specify absence of the dominant interferer.

20. The apparatus of claim 16, further comprising means for selecting to access the target serving base station from a set of potentially accessible base stations.

21. The apparatus method of claim 1, wherein the at least one resource of the particular time interlace or of the particular frequency subband represents a periodic set of subframes.

22. A computer program product, comprising:
a non-transitory computer-readable medium comprising:
code for causing at least one computer to identify whether a dominant interferer is present within proximity of a mobile device, the dominant interferer being identified based at least in part on downlink interference measured by the mobile device;
code for causing the at least one computer to measure downlink interference levels associated with a set of resources of different time interlaces;
code for causing the at least one computer to select at least one resource of a particular time interlace from the set based on the measured downlink interference levels;
code for causing the at least one computer to generate an access probe that includes an interference indicator for indicating a presence of the dominant interferer, the access probe further including a resource indicator specifying the at least one resource of the particular time interlace, selected by the mobile device based on the measured downlink interference levels, on which to receive an access grant signal or a subsequent access related message from a target serving base station that is not currently serving the mobile device in response to the access probe; and
code for causing the at least one computer to transmit the access probe to the target serving base station to initiate an access procedure to connect the mobile device from a currently serving base station to the target serving base station, the target base station being selected based at least in part on a signal quality between the mobile device and the target base station.

23. The computer program product of claim 22, wherein the interference indicator is conveyed via an explicit flag, an explicit indication of an observed interference level, or a Channel Quality Indicator (CQI) value included in a payload of the access probe.

24. An apparatus, the apparatus being a mobile device, comprising:
an interference evaluation component configured:
to measure strength of signals received from a target serving base station and at least one non-serving base station, and
to identify whether one of the at least one non-serving base station is a dominant interferer within proximity of the mobile device, the dominant interferer being identified based at least in part on downlink interference measured by the mobile device;
a downlink resource selection component configured:
to analyze observed downlink interference on a set of downlink control resources, and
to select at least one downlink control resource from the set based on the analysis of the observed downlink interference;
an access probe generation component configured to generate an access probe that includes an interference indicator for indicating a presence of the dominant interferer, the access probe further including a resource indicator specifying the at least one downlink control resource, selected by the mobile device based on the analysis of the observed downlink interference, on which to receive an access grant signal or a subsequent access related message from a target serving base station that is not currently serving the mobile device in response to the access probe; and
a transmitter configured to transmit the access probe to the target serving base station to initiate an access procedure to connect the mobile device from a currently serving base station to the target serving base station, the target base station being selected based at least in part on a signal quality between the mobile device and the target base station.

25. A method, comprising:
receiving, by a target serving base station, an access probe from a mobile device not served by the target base station, the access probe initiating a procedure to connect the mobile device from a currently serving base station to the target serving base station, the target base station being selected based at least in part on a signal quality between the mobile device and the target base station;
evaluating an interference indicator included in the access probe to identify whether the mobile device has detected a presence of a dominant interferer, the dominant interferer causing interference on downlink reception of the mobile device, the access probe further including a resource indicator that specifies at least one time-frequency resource requested for subsequent downlink transmissions, wherein the at least one time-frequency resource is selected by the mobile device from a set of possible time-frequency resources based on measuring downlink interference levels associated with the set of possible time-frequency resources;
selecting one of the at least one time-frequency resource when the mobile device has detected the presence of the dominant interferer; and
transmitting, from the target serving base station, an access grant signal or a subsequent access related message to the mobile device using the selected time-frequency resource.

26. The method of claim 25, wherein the dominant interferer is a non-serving base station that causes significant interference to the mobile device.

27. The method of claim 25, wherein the interference indicator is included in at least part of a payload of the access probe.

28. The method of claim 27, further comprising detecting an explicit flag of the interference indicator to determine the presence or an absence of the dominant interferer.

29. The method of claim 27, further comprising:
determining an explicit indication of an observed interference level from the interference indicator of the access probe; and
detecting the presence or an absence of the dominant interferer based upon the observed interference level.

30. The method of claim 27, further comprising:
analyzing a Channel Quality Indicator (CQI) value included in the interference indicator;
determining the presence of the dominant interferer when the CQI value matches a reserved CQI value; and
determining an absence of the dominant interferer when the CQI value matches a non-reserved CQI value.

31. The method of claim 25, further comprising selecting the time-frequency resource based upon a predetermined rule.

32. The method of claim 25, further comprising selecting the time-frequency resource based upon negotiation with at least a disparate network entity or a neighboring base station.

33. A wireless communications apparatus, comprising:
at least one processor configured to:
analyze an interference indicator included in a payload of an access probe received from a mobile device to identify whether the mobile device has detected a presence of a dominant interferer, the dominant interferer being identified based at least in part on downlink interference measured by the mobile device, the access probe further including a resource indicator that specifies at least one frequency subband resource requested for subsequent downlink transmissions, wherein the at least one frequency subband resource is selected by the mobile device from a set of possible resources of different frequency subbands based on measuring downlink interference levels associated with the set of possible resources, the received access probe initiating an access procedure to connect the mobile device from a currently serving base station to a target serving base station that is selected based at least in part on a signal quality between the mobile device and the target base station;
select one of the at least one frequency subband resource when the mobile device has detected the presence of the dominant interferer; and
transmit, from the target serving base station, an access grant signal or a subsequent access related message to the mobile device using the selected frequency subband resource.

34. The wireless communications apparatus of claim 33, in which the at least one processor is further configured to identify a value of an explicit flag in the interference indicator to determine the presence or an absence of the dominant interferer.

35. The wireless communications apparatus of claim 33, in which the at least one processor is further configured:
to detect an explicit indication of an observed interference level from the interference indicator of the access probe; and
to determine whether the explicit indication corresponds to the presence or an absence of the dominant interferer.

36. The wireless communications apparatus of claim 33, in which the at least one processor is further configured:
  to analyze a Channel Quality Indicator (CQI) value included in the interference indicator;
  to determine presence of the dominant interferer when the CQI value matches a reserved CQI value; and
  to determine absence of the dominant interferer when the CQI value matches a non-reserved CQI value.

37. The wireless communications apparatus of claim 33, wherein the frequency subband resource is selected based upon at least a predetermined rule or negotiation with at least a disparate network entity or a neighboring base station.

38. An apparatus, comprising:
  means for analyzing an interference indicator included in a payload of an access probe received from a mobile device to identify whether the mobile device has detected a presence of a dominant interferer, the dominant interferer being identified based at least in part on downlink interference measured by the mobile device, the access probe further including a resource indicator that specifies at least one time-frequency resource requested for subsequent downlink transmissions, wherein the at least one time-frequency resource is selected by the mobile device from a set of possible time-frequency resources based on measuring downlink interference levels associated with the set of possible time-frequency resources, the access probe initiating an access procedure to connect the mobile device from a currently serving base station to a target serving base station that is selected based at least in part on a signal quality between the mobile device and the target base station;
  means for selecting one of the at least one time-frequency resource when the mobile device has detected the presence of the dominant interferer; and
  means for transmitting, from the target serving base station, an access grant signal or a subsequent access related message to the mobile device using the selected time-frequency resource.

39. The apparatus of claim 38, wherein the interference indicator is an explicit flag, an explicit indication of an observed interference level, or a Channel Quality Indicator (CQI) value.

40. The apparatus of claim 38, wherein the means for selecting the one of the at least one time-frequency resource further selects the one of the at least one time-frequency resource as a function of a set of resources reserved for lower power base stations.

41. A computer program product, comprising:
  a non-transitory computer-readable medium comprising:
  code for causing at least one computer to analyze an interference indicator included in a payload of an access probe received from a mobile device to identify whether the mobile device has detected a presence of a dominant interferer, the dominant interferer being identified based at least in part on downlink interference measured by the mobile device, the access probe further including a resource indicator that specifies at least one time-frequency resource requested for subsequent downlink transmissions, wherein the at least one time-frequency resource is selected by the mobile device from a set of possible time-frequency resources based on measuring downlink interference levels associated with the set of possible time-frequency resources, the access probe initiating an access procedure to connect the mobile device from a currently serving base station to a target serving base station that is selected based at least in part on a signal quality between the mobile device and the target base station;
  code for causing the at least one computer to select one of the at least one time-frequency resource when the mobile device has detected the presence of the dominant interferer; and
  code for causing the at least one computer to transmit, from the target serving base station, an access grant signal or a subsequent access related message to the mobile device using the selected time-frequency resource.

42. The computer program product of claim 41, wherein the interference indicator is an explicit flag, an explicit indication of an observed interference level, or a Channel Quality Indicator (CQI) value.

43. An apparatus, comprising:
  a signaled interference identification component configured:
  to evaluate an access probe received from a mobile device to determine that an interference indicator conveyed by the access probe specifies a presence or absence of a dominant interferer, the dominant interferer being identified by the mobile device based at least in part on downlink interference measured by the mobile device; and
  to detect a resource indicator that specifies at least one time-frequency resource requested for subsequent downlink transmissions, wherein the at least one time-frequency resource is selected by the mobile device from a set of possible time-frequency resources based on measuring downlink interference levels associated with the set of possible time-frequency resources, the received access probe initiating an access procedure to connect the mobile device from a currently serving base station to a target serving base station that is selected based at least in part on a signal quality between the mobile device and the target base station;
  a resource allocation component configured to select one of the at least one time-frequency resource when the mobile device has detected the presence of the dominant interferer; and
  an access grant transmission component configured to transmit, from the target serving base station, an access grant signal or a subsequent access related message using the selected resource.

44. A method, comprising:
  measuring by a mobile device downlink interference levels associated with a set of potential time-frequency resources to yield information associated with downlink interference;
  selecting by the mobile device at least one time-frequency resource from the set of potential time-frequency resources for the mobile device to receive at least an access grant signal or a subsequent access related message in response to an access probe, the at least one time-frequency resource being selected based at least in part on the information associated with downlink interference;
  generating the access probe that includes a resource indicator that identifies the selected at least one time-frequency resource; and
  transmitting the access probe to a target serving base station that is not currently serving the mobile device to initiate an access procedure to connect the mobile device from a currently serving base station to the target serving base station, the target base station being selected based at least in part on a signal quality between the mobile device and the target base station.

45. The method of claim 44, wherein the information associated with downlink interference includes broadcasted information for a subset of resources reserved for a lower power base station.

46. The method of claim 44, wherein the resource indicator includes at least one interlace identifier (ID) encoded in the access probe, and the at least one interlace ID identifies at least one interlace as the selected at least one time-frequency resource preferred to be used for the access grant signal or the subsequent access related message.

47. The method of claim 44, wherein the resource indicator includes at least one subframe as the selected at least one time-frequency resource preferred to be utilized for the at least the access grant signal or the subsequent access related message.

48. The method of claim 44, wherein the access probe further includes an interference indicator for indicating the presence of downlink interference.

49. A wireless communications apparatus, comprising:
at least one processor configured to:
measure by a mobile device downlink interference levels associated with a set of potential time-frequency resources to yield information associated with downlink interference;
select, by the mobile device, at least one time-frequency resource from the set of potential time-frequency resources for the mobile device to receive an access grant signal or a subsequent access related message in response to an access probe, the at least one time-frequency resource being selected based at least in part on the information associated with downlink interference;
generate the access probe that includes a resource indicator that identifies the selected at least one time-frequency resource; and
transmit the access probe to a target serving base station that is not currently serving the mobile device to initiate an access procedure to connect the mobile device from a currently serving base station to the target serving base station, the target base station being selected based at least in part on a signal quality between the mobile device and the target base station.

50. The wireless communications apparatus of claim 49, wherein the information associated with downlink interference includes broadcasted information for a subset of resources reserved for a lower power base station.

51. The wireless communications apparatus of claim 49, wherein the resource indicator includes at least one interlace identifier (ID) encoded in the access probe, and the at least one interlace ID identifies at least one interlace as the selected as least one time-frequency resource preferred to be used for the access grant signal or the subsequent access related message.

52. The wireless communications apparatus of claim 49, wherein the resource indicator includes at least one subframe as the selected as least one time-frequency resource preferred to be used for the access grant signal or the subsequent access related message.

53. The wireless communications apparatus of claim 49, wherein the access probe further includes an interference indicator for indicating the presence of downlink interference.

54. An apparatus, comprising:
means for measuring by a mobile device downlink interference levels associated with a set of potential time-frequency resources to yield information associated with downlink interference;
means for selecting, by the mobile device, at least one time-frequency resource from the set of potential time-frequency resources for the mobile device to receive an access grant signal or a subsequent access related message in response to an access probe, the at least one time-frequency resource being selected based at least in part on the information associated with downlink interference;
means for generating the access probe that includes a resource indicator that identifies the selected at least one time-frequency resource; and
means for transmitting the access probe to a target serving base station that is not currently serving the mobile device to initiate an access procedure to connect the mobile device from a currently serving base station to the target serving base station, the target base station being selected based at least in part on a signal quality between the mobile device and the target base station.

55. The apparatus of claim 54, wherein the information associated with downlink interference includes broadcasted information for a subset of resources reserved for a lower power base station.

56. The apparatus of claim 54, wherein the resource indicator includes at least one interlace identifier (ID) encoded in the access probe, and the at least one interlace ID identifies at least one interlace as the selected at least one time-frequency resource preferred to be used for the access grant signal or the subsequent access related message.

57. The apparatus of claim 54, wherein the resource indicator includes at least one subframe as the selected at least one time-frequency resource preferred to be utilized for the access grant signal or the subsequent access related message.

58. The apparatus of claim 54, wherein the access probe further includes an interference indicator for indicating the presence of downlink interference.

59. A computer program product, comprising:
a non-transitory computer-readable medium comprising:
code for causing at least one mobile device to measure downlink interference levels associated with a set of potential time-frequency resources to yield information associated with downlink interference;
code for causing the at least one mobile device to select at least one time-frequency resource from the set of potential time-frequency resources for the mobile device to receive an access grant signal or a subsequent access related message in response to an access probe, the at least one time-frequency resource being selected based at least in part on the information associated with downlink interference;
code for causing the at least one mobile device to generate the access probe that includes a resource indicator that identifies the selected at least one time-frequency resource; and
code for causing the at least one mobile device to transmit the access probe to a target serving base station that is not currently serving the mobile device to initiate an access procedure to connect the mobile device from a currently serving base station to the target serving base station, the target base station being selected based at least in part on a signal quality between the mobile device and the target base station.

60. The computer program product of claim 59, wherein the information associated with downlink interference includes broadcasted information for a subset of resources reserved for a lower power base station.

61. The computer program product of claim 59, wherein the resource indicator includes at least one interlace identifier (ID) encoded in the access probe, and the at least one interlace ID identifies at least one interlace as the selected at least one time-frequency resource preferred to be used for the access grant signal or the subsequent access related message.

62. The computer program product of claim 59, wherein the resource indicator includes at least one subframe as the selected at least one time-frequency resource preferred to be utilized for the access grant signal or the subsequent access related message.

63. The computer program product of claim 59, wherein the access probe further includes an interference indicator for indicating the presence of downlink interference.

64. An apparatus, comprising:
  a downlink resource selection component configured to measure, by a mobile device, downlink interference levels associated with a set of potential time-frequency resources to yield information associated with downlink interference and select, by the mobile device, at least one time-frequency resource from the set of potential time-frequency resources for the mobile device to receive an access grant signal or a subsequent access related message in response to an access probe, the at least one time-frequency resource being selected based at least in part on the information associated with downlink interference; and
  an access probe generation component configured:
    to generate the access probe that includes a resource indicator that identifies the selected at least one time-frequency resource, and
    to transmit the access probe to a target serving base station that is not currently serving the mobile device to initiate an access procedure to connect the mobile device from a currently serving base station to the target serving base station, the target base station being selected based at least in part on a signal quality between the mobile device and the target base station.

* * * * *